(12) United States Patent
Min et al.

(10) Patent No.: US 10,154,427 B2
(45) Date of Patent: Dec. 11, 2018

(54) METHOD AND APPARATUS FOR MANAGING DEVICE USING AT LEAST ONE SENSOR

(71) Applicant: SAMSUNG ELECTRONICS CO., LTD., Suwon-si, Gyeonggi-do (KR)

(72) Inventors: Hyunsuk Min, Suwon-si (KR); Jieun Kim, Suwon-si (KR); Yunjae Lim, Seoul (KR); Changseok Lee, Osan-si (KR); Sangsun Choi, Seoul (KR); Jaeeun Kang, Suwon-si (KR); Junho Koh, Suwon-si (KR); Jongyoub Ryu, Suwon-si (KR); Yonghyun Lim, Suwon-si (KR)

(73) Assignee: Samsung Elctronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/368,870

(22) Filed: Dec. 5, 2016

(65) Prior Publication Data

US 2017/0164224 A1   Jun. 8, 2017

(30) Foreign Application Priority Data

Dec. 4, 2015 (KR) .......................... 10-2015-0172733

(51) Int. Cl.
*H04W 4/70* (2018.01)
*H04W 24/08* (2009.01)
(Continued)

(52) U.S. Cl.
CPC ............. *H04W 24/08* (2013.01); *H04W 4/02* (2013.01); *H04W 4/70* (2018.02); *H04W 84/18* (2013.01)

(58) Field of Classification Search
CPC .. G08C 17/02; G08C 2201/41; G08C 2201/42; G08C 2201/50; G08C 2201/93;
(Continued)

(56) References Cited

U.S. PATENT DOCUMENTS 7,155,305 B2 * 12/2006 Hayes .................... G05B 15/02
340/447
7,295,099 B2 * 11/2007 Lee ...................... G05B 23/0264
340/5.54
(Continued)

FOREIGN PATENT DOCUMENTS

| KR | 10-1392868 | 5/2014 |
|---|---|---|
| WO | 2015/020264 | 2/2015 |
| WO | 2015/052479 | 4/2015 |

OTHER PUBLICATIONS

Search Report dated Feb. 27, 2017 in counterpart International Patent Application No. PCT/KR2016/014194.

*Primary Examiner* — Julio Perez
(74) *Attorney, Agent, or Firm* — Nixon & Vanderhye P.C.

(57) ABSTRACT

The present disclosure relates to a sensor network, Machine Type Communication (MTC), Machine-to-Machine (M2M) communication, and technology for Internet of Things (IoT). The present disclosure may be applied to intelligent services based on the above technologies, such as smart home, smart building, smart city, smart car, connected car, health care, digital education, smart retail, security and safety services. A method of managing an electronic device is provided, which includes determining a management target device, selecting at least one measurement device based on the determined management target device, transmitting an operation command to the management target device, receiving measurement information from the at least one
(Continued)

measurement device, and determining a state of the management target device based on the received measurement information.

12 Claims, 24 Drawing Sheets

(51) Int. Cl.
*H04M 1/24* (2006.01)
*H04W 4/02* (2018.01)
*H04W 84/18* (2009.01)

(58) Field of Classification Search
CPC .... H04L 12/2818; H04W 4/70; H04W 24/08; H04M 1/24
See application file for complete search history.

(56) References Cited

U.S. PATENT DOCUMENTS

| | | |
|---|---|---|
| 2003/0045946 A1 | 3/2003 | Hattori et al. |
| 2006/0031459 A1* | 2/2006 | Ahn ................... H04L 12/2803 709/224 |
| 2011/0032423 A1* | 2/2011 | Jing ..................... H04L 12/282 348/552 |
| 2011/0054843 A1 | 3/2011 | Han et al. |
| 2011/0106279 A1* | 5/2011 | Cho ...................... G08C 17/02 700/90 |
| 2012/0314901 A1* | 12/2012 | Hanson ............... A61B 5/0077 382/103 |
| 2015/0019710 A1 | 1/2015 | Shaashua et al. |
| 2015/0201022 A1 | 7/2015 | Kim et al. |
| 2016/0261931 A1* | 9/2016 | Fadell .................... H04Q 9/00 |

* cited by examiner

Management Target Device List 1

Management Target Device List 2

FIG. 8B

| Device Type | Threshold |
|---|---|
| Contact Sensor | $Th_c$ |
| Motion Sensor | $Th_m$ |
| Door Lock | $Th_d$ |
| Temperature Sensor | $Th_t$ |
| ⋮ | ⋮ |

Threshold Value Information

METHOD AND APPARATUS FOR MANAGING DEVICE USING AT LEAST ONE SENSOR

CROSS-REFERENCE TO RELATED APPLICATION

The present application is based on and claims priority under 35 U.S.C. § 119 to Korean Patent Application No. 10-2015-0172733, filed on Dec. 4, 2015 in the Korean Intellectual Property Office, the disclosure of which is incorporated by reference herein in its entirety.

BACKGROUND

Field

The present disclosure relates generally to a method and an apparatus for managing a device, and for example to a method for managing a device, which determines a state of at least one device in a predetermined space using at least one sensor, and manages the device based on the result of the determination.

Description of Related Art

The Internet, which is a human centered connectivity network where humans generate and consume information, is now evolving to the Internet of Things (IoT) where distributed entities, such as things, exchange and process information. The Internet of Everything (IoE), which is a combination of the IoT technology and big data processing technology through connection with a cloud server, has emerged. As technology elements, such as sensing technology, wired/wireless communication and network infrastructure, service interface technology, and security technology have been demanded for IoT implementation, a sensor network, a Machine-to-Machine (M2M) communication, Machine Type Communication (MTC), and so forth have been recently researched.

Such an IoT environment may provide intelligent Internet Technology (IT) services that create a new value to human life by collecting and analyzing data generated among connected things. The IoT may be applied to a variety of fields including smart home, smart building, smart city, smart car or connected cars, smart grid, health care, smart appliances and advanced medical services through convergence and combination between existing Information Technology (IT) and various industrial applications.

In order to manage a plurality of devices existing in a predetermined indoor space in the related art, a human will manually confirm whether the respective devices are operated. Particularly, in a hotel other than a home, a staff of the hotel should continuously check device states in a certain space every day, and if an abnormal situation of a device in the certain space occurs in a state where a customer has put up at the hotel, customer satisfaction may deteriorate and thus service quality evaluation of the hotel may deteriorate. Further, if it is delayed to take measures against a device trouble, the corresponding certain space is unable to be provided to a customer to cause a loss of costs.

Accordingly, there has been a need for a method for managing the state of a device in a certain space without installing any additional device. Further, the above-described problem occurring in the hotel certain space may also occur in the same manner in a device that is installed in a place, such as an office, a school practice room, or an educational room, and a method to address the problem is needed.

SUMMARY

The present disclosure is provided to address the above problems, and an example aspect of the present disclosure proposes a method for determining and managing a state of a device using at least one sensor.

Another example aspect of the present disclosure proposes a method for improving accuracy in determining a state of a device by controlling an additional device that corresponds to the device.

In accordance with an example aspect of the present disclosure, a method of managing an electronic device includes determining a management target device when a specific event occurs; selecting at least one measurement device based on the determined management target device; receiving measurement information measured by at least one measurement device; and determining a state of the management target device based on the received measurement information.

In accordance with another example aspect of the present disclosure, an electronic device includes a transceiver configured to perform communication with another network entity; and a controller configured to determine a management target device when a specific event occurs, to select at least one measurement device based on the determined management target device, to receive measurement information measured by the at least one measurement device, and to determine a state of the management target device based on the received measurement information.

According to the various example aspects of the present disclosure, since the state of a device is determined through information that is received from at least one sensor, the device can be efficiently managed without the necessity of device change or additional device installation.

Further, since an additional device that corresponds to the device is controlled, accuracy in determining the state of the device can be improved.

BRIEF DESCRIPTION OF THE DRAWINGS

The above and other aspects, features and attendant advantages of the present disclosure may be more readily appreciated and understood from the following detailed description, taken in conjunction with the accompanying drawings, in which like reference numerals refer to like elements, and wherein:

FIG. 8B is a diagram illustrating example threshold value information according to a fifth example embodiment of the present disclosure;

DETAILED DESCRIPTION

Figure 1:
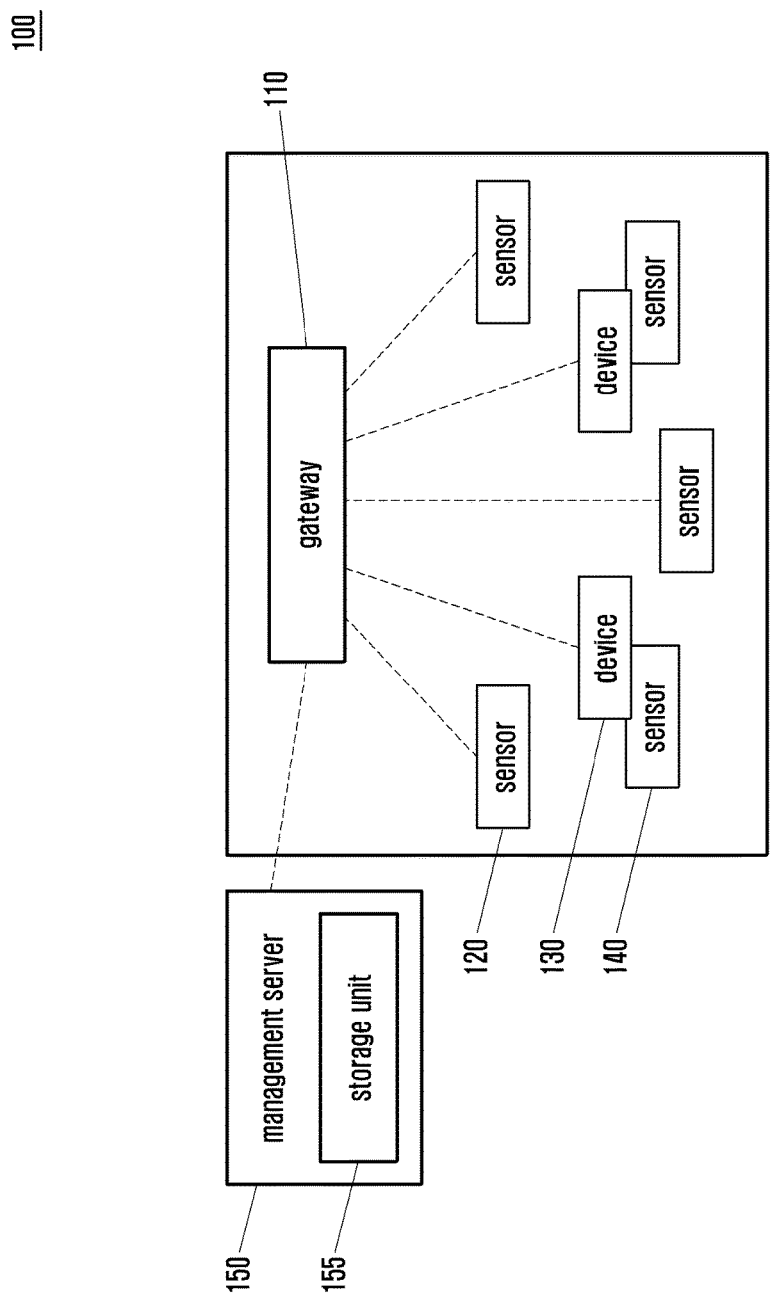
FIG. 1 is a diagram illustrating an example configuration of a device management system according to an example embodiment of the present disclosure.

Hereinafter, various example embodiments of the present disclosure will be described in greater detail with reference to the accompanying drawings. In the accompanying drawings, it is to be noted that the same drawing reference numerals are used for the same elements. Further, detailed explanation of known functions and configurations, which may obscure the subject matter of the present disclosure, may be omitted.

In explaining the various example embodiments in the following description, explanation of technical contents which are well known in the art to which the present disclosure pertains and are not directly related to the present disclosure may be omitted in order to explain the subject matter of the present disclosure more clearly without obscuring the same through omission of unnecessary explanations.

For the same reason, in the accompanying drawings, sizes and relative sizes of some constituent elements may be exaggerated or omitted. Further, sizes of the respective constituent elements do not completely reflect the actual sizes thereof. In the drawings, the same drawing reference numerals are used for the same or corresponding elements across various figures.

The example aspects and features of the present disclosure and methods for achieving the aspects and features will be apparent by referring to the various example embodiments to be described in greater detail below with reference to the accompanying drawings. However, the present disclosure is not limited to the example embodiments disclosed hereinafter, but can be implemented in diverse forms. The matters defined in the description, such as the detailed construction and elements, are merely examples provided to assist those of ordinary skill in the art in a comprehensive understanding of the disclosure. In the detailed description of the present disclosure, the same drawing reference numerals are used for the same elements across various figures.

In this case, it will be understood that each block of the flowchart illustrations, and combinations of blocks in the flowchart illustrations, can be implemented by computer program instructions. These computer program instructions can be provided to a processor, such as, for example, a dedicated processor, a CPU, a general purpose computer, special purpose computer, processing circuitry or other programmable data processing apparatus to produce a machine, such that the instructions, which execute via the processor of the computer or other programmable data processing apparatus, cause implementation of the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instructions that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Also, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks illustrated in succession may in fact be executed substantially concurrently or the blocks may sometimes be executed in the reverse order, depending upon the functionality involved.

The term "unit", as used herein may refer, for example, but is not limited to, a software or hardware component, such as, for example, processing circuitry, a dedicated processor, a CPU, a Field Programmable Gate Array (FPGA) or Application Specific Integrated Circuit (ASIC), or the like, which performs certain tasks. However, a unit is not to be limited to software or hardware. A unit may advantageously be configured to reside on the addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry (e.g., including processing circuitry), data, databases, data structures, tables, arrays, and variables. The functionality provided for in the components and units may be combined into fewer components and units or further separated into additional components and units. Further, the components and units may be implemented to operate one or more CPUs in a device or a security multimedia card.

FIG. 1 is a diagram illustrating an example configuration of a device management system 100 according to an example embodiment of the present disclosure.

Referring to FIG. 1, a device management system 100 may include an electronic device 110, a sensor 120, a device 130, a sensor 140 attached to or associated with the device, and a management server 150. Further, the management server 150 may further include a storage unit 155.

The electronic device 110, the sensor 120, the device 130, and the sensor 140 attached to the device may be located in a predetermined space or a certain space, and the predetermined space may, for example, be in an office, a warehouse, a home, or a hotel. In the present disclosure, for convenience in explanation, a guest room of a hotel is exemplified, but the scope of the present disclosure is not limited thereto.

The electronic device 110 may refer, for example, to a device that is used to control devices located in a certain space. The electronic device 110 may be connected (e.g., wirelessly or otherwise) to all devices located in the certain space to communicate with the devices. The electronic device 110 may receive measurement information from the devices and may determine states of the devices using the measurement information. The electronic device 110 may transmit the determined states of the devices to the management server 150 or a manager. Further, the electronic device 110 may be included in an electronic appliance, such as, for example, and without limitation, a TV, in the certain space in the form of, for example, a gateway. Further, the electronic device 110 may be located within the certain space as a separate device.

In order to select a device of which the state is to be determined (hereinafter referred to as "management target device"), the electronic device 110 may transmit a list of management target devices (hereinafter referred to as "management target device list") to the management server 150.

The management target device (e.g., 130) may refer, for example, to one of devices 130 located in the certain space, which is selected by the electronic device to check the state thereof. The management target device may communicate with the electronic device in the certain space, a measurement device, and a server. Further, the management target device may store device operation and control histories therein, and may control the device based on an operation command of the electronic device.

The electronic device may select and manage all electronic devices located in the certain space as management target devices.

The electronic device 110 may select a management target device in a predetermined period or based on a predetermined condition, and may determine the state of the device. Further, a manager 150 that has received the management target device list may select any one of the devices 130 included in the management target device list as the management target device, and may determine the state of the device.

Further, the electronic device 110 may be connected to at least one device and sensor through various communications (e.g., wirelessly or otherwise), and the electronic device 110 that has confirmed the management target device may receive information that is measured by the sensor 120 or information that is measured by the sensor 140 attached to the device through the communications. In this example, the electronic device and the sensor may include various types of communication methods, such as, for example, and without limitation, one or more of Bluetooth, ZigBee, Ultra WideBand (UWB), Wi-Fi, Z-wave, KNX, SCS, Bluetooth Low Energy (BLE), and Infrared Ray (IR).

Further, the electronic device 110 may determine the state of the device using the received measurement information. The electronic device 110 may receive at least one piece of measurement information, generate device state information through adaptive combination of the received measurement information, and determine the state of the device using the device state information.

In the case of combining the received measurement information, the electronic device 110 may modify the measurement information to match a predetermined data type, and may generate the device state information through a combination process.

The electronic device 110 may be included in any one of devices that are located in the certain space, or may be located in the certain space as a separate device.

The sensor 120 may refer, for example, to a measurement device for measuring the states of the devices that are located in the certain space. In the present disclosure, the terms "sensor" and "measurement device" may be used interchangeably. The measurement device may be operated in accordance with an operation command to measure the state of the device, and may generate the measurement information. Further, the measurement device may periodically measure the state of the device to generate the measurement information. The measurement device that has generated the measurement information may transmit the measurement information to the electronic device 110. The measurement device may transmit the measurement information based on a request from the electronic device 110 or periodically. Further, the measurement device may store the measurement information therein.

The electronic device may determine the state of the device using the whole or a part of the received measurement information.

The sensor 140 attached to the device may include a sensor that is attached to the device to check the state of the corresponding device. For example, the sensor 140 attached to the device may include an illumination sensor that is attached to an illumination device (lamp) to check the state of the illumination device (lamp).

Hereinafter, a lamp will be described as an example of the illumination device. However, the various example embodiments of the present disclosure are not limited thereto.

Further, the sensor 140 that is attached to the device may include a sensor that is included in the device for the purpose excluding the checking. For example, the sensor 140 that is attached to the device may include an illumination sensor that is included in a content display device (TV) for brightness adjustment of the content display device (TV).

The electronic device may use the illumination sensor that is included in the lamp or the illumination sensor that is included in the content display device (TV) to check the state of the illumination device (lamp).

Hereinafter, a TV will be described as an example of the content display device. However, the various example embodiments of the present disclosure are not limited thereto.

In the same manner as the sensor 120, the sensor 140 that is attached to the device may measure a peripheral device based on a measurement command of the electronic device, and may generate and transmit measurement information to the electronic device.

The management server 150 may refer, for example, to, a server that is included in a hotel management system or a building management system. The management server 150 may request the electronic device 110 to manage the management target device, and may receive device state information of the specific device from the electronic device 110 to store the received device state information in the storage unit 150. The management server 150 may modify the device state information to match a predetermined data type, and may store the modified device state information in the storage unit 155. Further, the server may transmit the received device state information to a portable terminal or a computer of a manager.

Further, if an abnormal state of the device is sensed through the device state information that is received from the electronic device 110, the management server may transmit a notification message to a portable terminal of a manager or a management computer.

The above-described process of sensing the abnormal state of the device may be determined by the electronic device 110 using the device state information that is generated by the electronic device 110 to be transmitted to the management server 150, or may be determined by the management server 150.

FIGS. 2A to 2D are diagrams illustrating an example method for managing a device using at least one measurement device according to an example embodiment of the present disclosure.

Figure 2A:
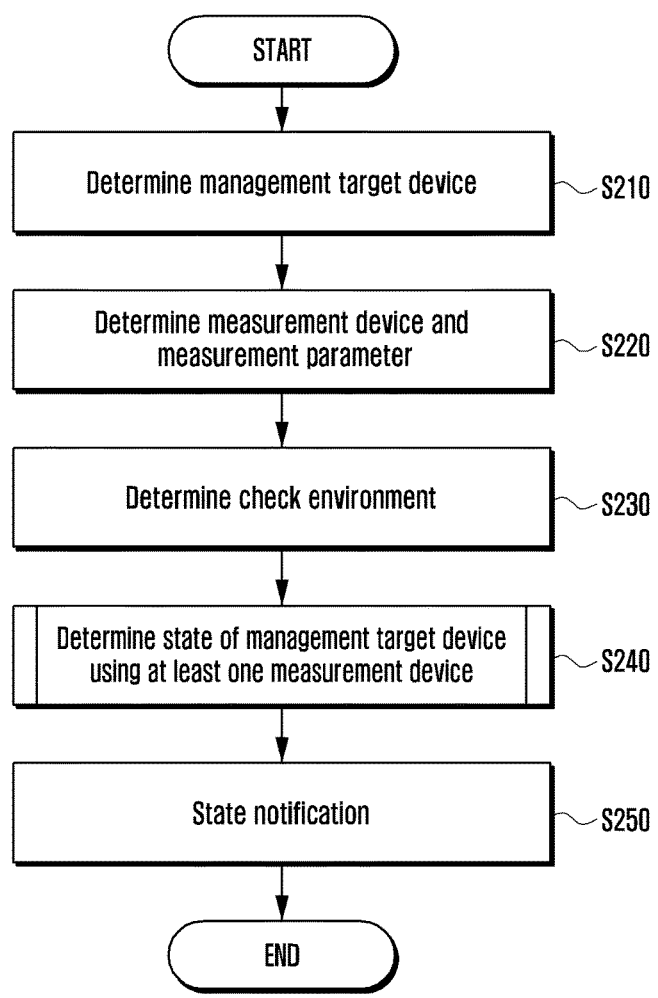
FIG. 2A is a flowchart illustrating an example method for managing a device using at least one measurement device according to an example embodiment of the present disclosure.

Referring to the flowchart illustrated in FIG. 2A, at operation S210, an electronic device may determine a management target device. The management target device may include any device that can be controlled by the electronic device in a certain space.

Devices in the certain space may be classified by management items. Accordingly, the electronic device may determine the management item to determine the management target device, and may confirm the management target device in accordance with the item.

For example, the management items may include illumination, temperature, air state, battery, and sound.

If a predetermined condition is satisfied, the electronic device may determine the management item in accordance with the condition. For example, in the case where a user is absent and an environment for checking illumination is satisfied (e.g., a window or a curtain is closed), the electronic device may select illumination as the management item (hereinafter, "user is absent" refers to a state in which the user is not located in the certain space). Further, the electronic device may determine a lamp replacement period through a lamp replacement history and may select illumination as the management item when the replacement period arrives.

Further, the electronic device may determine the management item through a manager's input.

If the management item is determined, the electronic device may provide a management target device list in accordance with management target kinds to the manager through transmission of the management target device list to a management server.

For example, if illumination is selected as the management item, the electronic device may provide a management target device list that includes plural illuminations, such as a living room fluorescent lamp, a bedroom fluorescent lamp, and a bedroom sleeping lamp, to the manager, and may select the management target device based on the manager's selection.

Further, the electronic device may determine a device, which satisfies a predetermined condition among devices included as management items, as the management target device. For example, in the case where a user is absent and a lamp is located in a space that satisfies the environment for checking the illumination (e.g., a living room window or curtain is closed), the electronic device may determine the lamp that is located in the living room as the management target device. Further, the electronic device may determine a lamp replacement period through a replacement history of each lamp, and may select the lamp of which the replacement period arrives as the management target device.

On the other hand, the electronic device may determine the management target device without determining the management item. If the management item is not determined, the electronic device may individually determine the device that is located in the living room as the management target device. In order to determine the management target device, the electronic device may provide the management target device list to the manager. In addition, the electronic device may determine the management target device through reception of the management target device from the manager. Further, if the predetermined condition is satisfied, the electronic device may determine the management target device in accordance with the condition. Since the contents in the example where the predetermined condition is satisfied are the same as those as described above, a repeated detailed explanation thereof will be omitted.

Figure 2B:
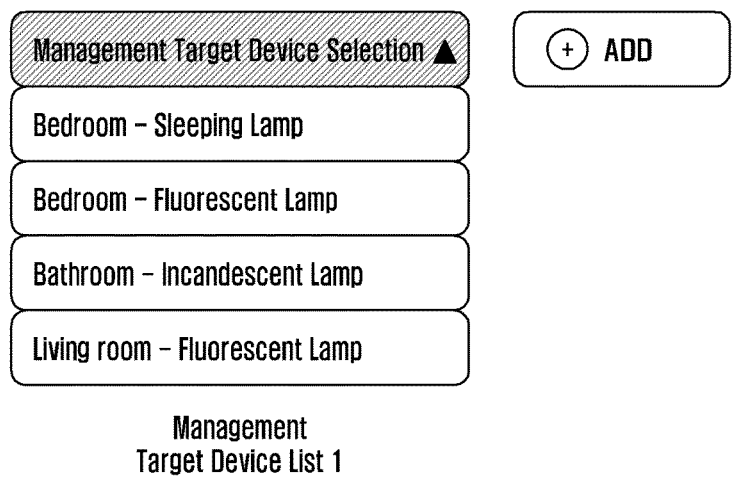
FIG. 2B is a diagram illustrating an example method for managing a device using at least one measurement device according to an example embodiment of the present disclosure.
Figure 2B:
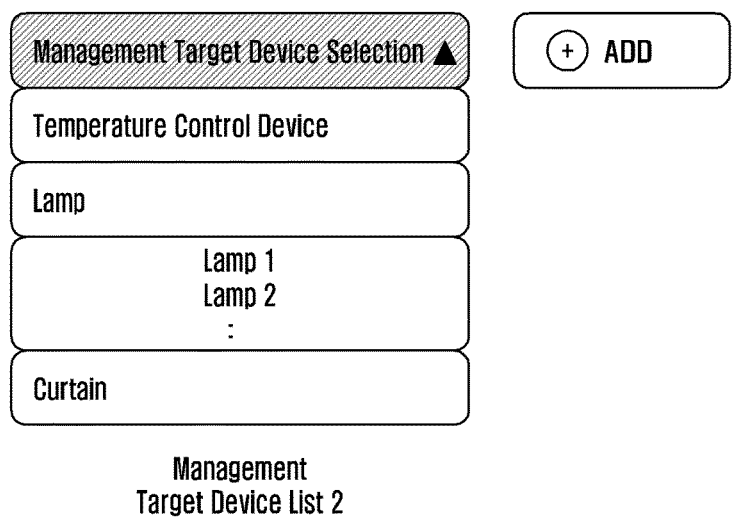

The management target device list that the electronic device provides to the manager may, for example, be as illustrated in FIG. 2B.

Referring to FIG. 2B, if the management item is determined, the electronic device may transmit the management target device list in which the management target devices are classified in accordance with the management items to the server.

A management target device list 1 illustrates a device list in the case where the illumination is selected as the management item. If the illumination is selected as the management item, the electronic device may provide the check target device list 1 that includes illumination devices located in a certain space, such as a bedroom fluorescent lamp, a bedroom sleeping lamp, and a living room fluorescent lamp, to the manager.

On the other hand, if the management item is not determined, the electronic device may provide a device list like a management target device list 2 to the manager. The management target device list 2 may include at least one of the devices located in the certain space.

The manager may set at least one of the devices included in the management target device list as the management target device.

Further, the electronic device may add a new device to the management target device list, or may delete one or more of the devices included in the management target device list.

If at least one device is set as the management target device, the electronic device may set the order of state determination for the management target devices.

For example, the electronic device may be set to perform state determination for the management target devices simultaneously or successively. If the state determination for the management target devices is performed successively, the electronic device may determine the order of state determination in accordance with the characteristics of the management target devices.

For example, it is assumed that a light source blocking device (curtain), a lamp, and a temperature control device are determined as the management target devices. Accurate device state determination can be performed in a state where the lamp and the temperature control device are not affected by an external environment. On the other hand, state determination of the light source blocking device (curtain) is not affected by the external environment. Accordingly, the electronic device may determine the management order so that it first determines the state of the light source blocking device (curtain) through checking whether the light source blocking device (curtain) is operated, and then determines the states of the lamp and the temperature control device in a state where the curtain is closed.

Further, the electronic device may determine the order of state determination for the management target devices based on the manager's input.

In the present disclosure, the curtain is exemplified as the light source blocking device. However, the scope of the present disclosure is not limited thereto.

Referring again to FIG. 2A, at operation S220, the electronic device that has set the management target devices may determine a measurement parameter that may have an effect on the state determination of the management target device and a sensor for measuring the measurement parameter (in the present disclosure, a sensor and a measurement device may be used interchangeably).

The measurement device may include, for example, and without limitation, a sensor that can directly sense the state of the management target device, a sensor that senses an environment state, or a sensor that senses a cause of measurement error occurrence. Further, all devices that are connected to the electronic device may be determined as measurement devices.

In this example, the electronic device may set at least one measurement device, and may manage the state of the management target device based on the measurement information that is received through the measurement device and an external or internal environment.

For example, in the case of determining the state of a lamp, an illumination amount, whether an obstacle exists between a measurement device and a lamp, and whether a window is opened or closed may have an effect on the state determination of the lamp. Accordingly, the electronic device may determine an illumination amount, whether an obstacle exists between a measurement device and a lamp, and whether a window is opened or closed as measurement parameters, and may determine an illumination sensor for measuring the illumination amount, a proximity sensor, and a contact sensor as measurement devices. The electronic device may generate device state information by adaptively combining pieces of measurement information that are received through the illumination sensor, the proximity sensor, and the contact sensor based on the external or internal environment, and may determine the states of the management target devices.

As another example, in the case of determining the state of a temperature control device, an indoor temperature change amount, window open/close state, and an indoor air flow may have an effect on the state determination of the temperature control device. Accordingly, the electronic device may determine an indoor temperature change amount, window open/close state, and an indoor air flow as measurement parameters, and may determine a temperature sensor, a contact sensor, and a wind detection sensor as measurement devices. The electronic device may generate device state information of the management target devices by adaptively combining pieces of measurement information that are received through the temperature sensor, the contact sensor, and the wind detection sensor in accordance with the external or internal environment, and may determine the states of the management target devices.

As described above, the electronic device may identify whether the device is in an abnormal state using the measurement information that is received through the at least one measurement device. Further, the number of selected measurement devices and the kind thereof may differ depending on whether a condition or an environment (hereinafter referred to as "measurement condition," "measurement environment," or "check environment") for determining the state of the management target device is set. For example, the measurement environment is set if a condition for measuring the states of the measurement target device. For example, if the measurement environment is set, the electronic device may select a part of the at least one measurement device that can be selected in the case where the measurement environment is not set. Accordingly, if the measurement environment is set, the electronic device may determine whether the device is in an abnormal state using the measurement information that is received through the selected partial measurement devices. The details thereof will be described later.

Further, the electronic device may determine the number of measurement devices to be selected based on importance of the management target device. For example, the number of measurement devices for management target devices having low importance may be determined to be smaller than the number of measurement devices for management target devices having high importance.

For example, if a lamp that is located in a certain space becomes abnormal, this may cause direct inconvenience to a user. Since the lamp may be included in devices having high importance, the electronic device may select a large number of measurement devices to heighten reliability of the management result.

On the other hand, if the importance of the management target device is low, the electronic device may select measurement devices of which the number is smaller than the number of measurement devices having high importance in order to determine the states of the management target devices. For example, a contact sensor is a device for sensing the contact state, and may not cause direct inconvenience to the user even in the case where the contact sensor becomes in an abnormal state. Accordingly, the contact sensor may be included in devices having low importance, and the electronic device may select the measurement devices of which the number is smaller than the number of measurement devices having high importance.

Thereafter, at operation S230, the electronic device may control the devices that are connected to the electronic device to set the measurement environment. The reason why the electronic device sets the measurement environment is to improve reliability and accuracy in determining the states of the devices.

The electronic device may select additional devices for setting the measurement environment, and may set the measurement environment through control of the additional devices.

For example, in the case of determining the state of the lamp, the electronic device can accurately determine the state of the lamp only in a state where it is not affected by an external light source. Accordingly, the electronic device may select the window and the curtain as additional devices, and may operate to close the window and the curtain to set the measurement environment.

However, if the measurement environment has already been set or it is impossible to set the measurement environment, the electronic device may omit the operation S230 for setting the measurement environment.

On the other hand, depending on whether the measurement environment has been set as described above, the number of measurement devices and the kind thereof, which are selected at operation S220, may be changed. This is because, if the measurement environment has been set, it becomes possible to determine the states of the devices relatively accurately although a small number of measurement devices may be used.

For example, if the measurement environment has not been set, the electronic device may select the illumination sensor and the contact sensor as the measurement devices to determine the state of the lamp. On the other hand, if the measurement environment has been set, the electronic device may select only the illumination sensor that is a part of the measurement devices as the measurement device.

Thereafter, the electronic device may transmit an operation command for operating the management target device. This is because the management target device should be operated in order to measure the state of the management target device. Further, the electronic device may transmit an operation command for making the measurement device measure the management target device. Accordingly, the measurement device that has received the operation command may measure the state of the management target device, and the electronic device may receive the measurement information from the measurement device. The operation command may be transmitted at any one of operations after selection of the device.

Accordingly, at operation S240, the electronic device may determine the state of the management target device using the measurement information that is received through the measurement device. If the measurement environment has not been set, the electronic device may determine the state of the management target device using the measurement information that is received through a first measurement device set that is at least one measurement device.

On the other hand, if the measurement environment has been set, the electronic device may determine the state of the management target device using the measurement information that is received through partial measurement devices selected from the first measurement device set.

In the case of using the measurement information that is received through at least one measurement device in order to determine the state of the management target device, the electronic device may determine the state of the management target device by adaptively combining the measurement information that is received through the measurement device.

One measurement device may transmit one or more pieces of measurement information, and the electronic device may determine the state of the device by adaptively combining the at least one piece of measurement information that is received from the at least one measurement device. For example, in the case where the electronic device receives the measurement information from the measurement device through transmission of the operation command to the measurement device, the electronic device may determine the state of the device using the whole or a part of the received measurement information. Further, the electronic device may periodically receive the measurement information from plural measurement devices, and may determine the state of the device using only the measurement information that is received from the selected measurement device.

For example, the electronic device may determine the state of the management target device by adaptively combining the received measurement information based on the importance of the management target device.

For example, with respect to the management target device having high importance, the electronic device may determine the state of the management target device using the whole of the received measurement information, whereas with respect to the management target device having low importance, the electronic device may determine the state of the management target device using only a part of the received measurement information.

Further, even with respect to the same management target device, the electronic device may determine the state of the management target device by adaptively combining the measurement information that is received through the measurement device based on external factors.

For example, in the case of determining the state of the lamp at night, the open/close state of the window that is measured through the contact sensor may not have an effect on the amount of illumination of the lamp. Accordingly, the electronic device may generate device state information without using information related to the open/close state of the window.

The electronic device that has determined the state of the management target device, at operation S250, may notify a manager of the state of the management target device to a manager, and the manager may manage the device through replacement or repair of the device in accordance with the received state of the management target.

Figure 2C:
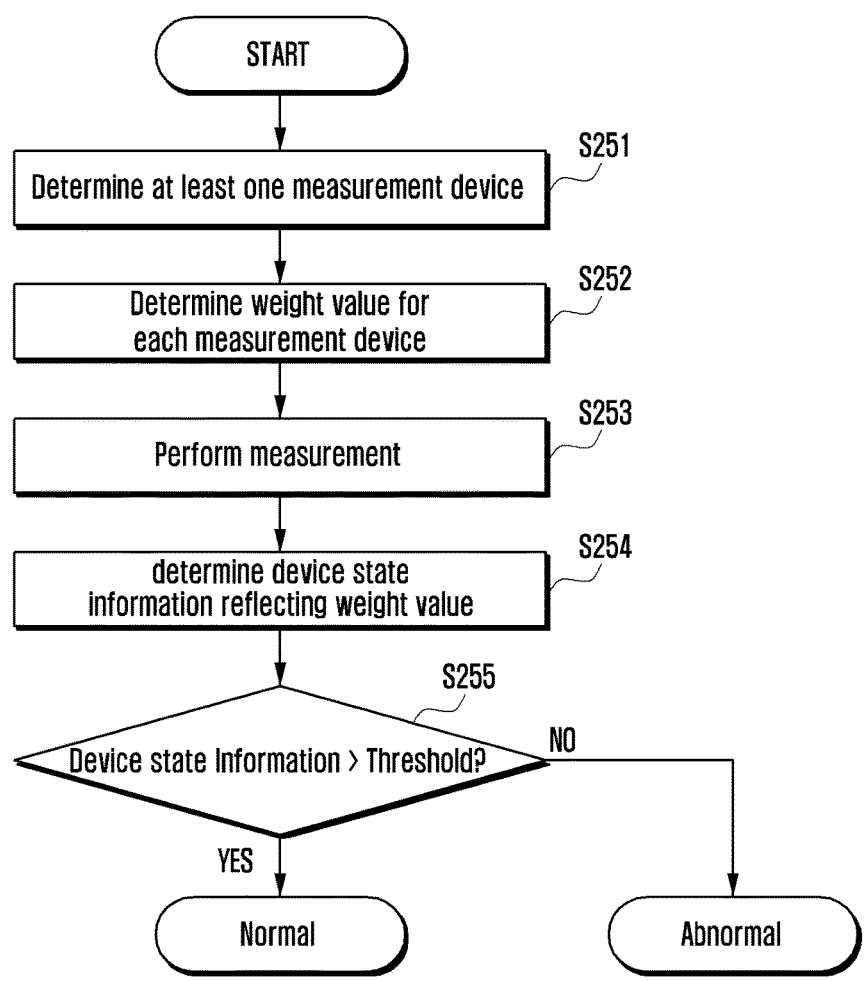
FIG. 2C is a flowchart illustrating an example method of managing a device using at least one measurement device according to an example embodiment of the present disclosure.

FIG. 2C is a flowchart illustrating an example process of determining the state of a management target device using measurement information that is received through at least two measurement devices according to an example embodiment of the present disclosure.

Referring to FIG. 2C, at operation S251, the electronic device 201 may determine at least one measurement device.

In the case of determining two or more measurement devices, the electronic device may determine a main measurement device and a sub-measurement device. In this example, the main measurement device may mean a measurement device that directly measures the state of the management target device. Further, the sub-measurement device may mean a device that measures factors that have an effect on the state of the management target device.

The factors that have an effect on the state of the management target device that is measured by the sub-measurement device may be as follows. The state of the management target device may be affected by external or internal factors. In this example, the external factors may include an environment state of a place where the management target device is located, and for example, may include temperature, humidity, illumination, and air flow. The internal factors may include a location of the management target device in a certain space and an arrangement of other devices or facilities. Further, the internal factors may include states of devices or facilities excluding the management target device.

In the case of determining the state of a lamp, for example, a method for determining a main measurement device and a sub-measurement device will be described. An illumination sensor for measuring an illumination amount may be determined as a main measurement device. Further, factors that have an effect on the state determination of the lamp may be whether an obstacle exists between the measurement device and the lamp and whether a window is opened or closed. Accordingly, a proximity sensor for measuring whether an obstacle exists between the measurement device and the lamp and a contact sensor for measuring whether the window is opened or closed may be determined as sub-measurement devices.

At operation S252, the electronic device that has determined at least one measurement device may determine a weight value for each measurement device.

In this example, the electronic device may adaptively determine the weight value for each measurement device in consideration of the extent that the internal and external factors have an effect on the state of the management target device.

As an example, the electronic device may use an algorithm that is disclosed in Mathematical Expression 1 below to determine a weight value for each measurement device.

---
[Mathematical Expression 1]

$W_i = x_i e_i$ w : weight of sensor
    x : fraction variable
    e : effect of sensor
    n : num, of sensors DecideOptimalWeight(e,$E_{max}$)
  for i=1 to n
    do x[ i ]=0
  effect=0
  while(effect<$E_{max}$)
    do i=best remaining item
    if effect+e[ i ]≤$E_{max}$
      then e[ i ]=1
        effect=effect+e[ i ]
    else
      x[ i ]=(e−effect)/e[ i ]
---

---
-continued

[Mathematical Expression 1]

effect=$E_{max}$
return x
---

In this case, "w" refers to a weight value for a measurement device, and the weight value for the measurement device may be calculated as a product of a partial variable x and an effect e of the measurement device. The partial variable x and the effect e of the measurement device may be calculated by the algorithm as described above.

However, determination of the weight value for each measurement device is not limited thereto.

On the other hand, at operation S252, the main measurement device and the sub-measurement device may be determined by the calculated weight value for each measurement device.

At operation S253, the electronic device that has calculated the weight value for each measurement device may perform the measurement using the measurement device.

At operation S254, the electronic device may determine the device state information by reflecting the weight value in the measurement result that is measured using the measurement device.

As an example, the method for determining the device state information may use Mathematical Expression 2 below.

$$M_{tot} = w_1 M_1 + w_2 M_2 + \ldots + w_n M_n = \sum_{i=1}^{n} w_i M_i \quad \text{[Mathematical Expression 2]}$$

w: weight

M: sensor measures n: num. of sensors

In this case, "$M_{tot}$" may refer to device state information, "w" may refer to a weight value for each measurement device, and "M" may refer to the measurement result for each measurement device. However, the method for determining device state information through reflection of weight values is not limited thereto.

At operation S255, the electronic device that has determined the device state information may determine whether the device state information exceeds a predetermined threshold value. If the device state information exceeds the predetermined threshold value as the result of determination, the electronic device may determine that the management target device is in a normal state.

On the other hand, if the device state information is smaller than the predetermined threshold value, the electronic device may determine that the management target device is in an abnormal state, and may notify the manager of this.

Figure 2D:
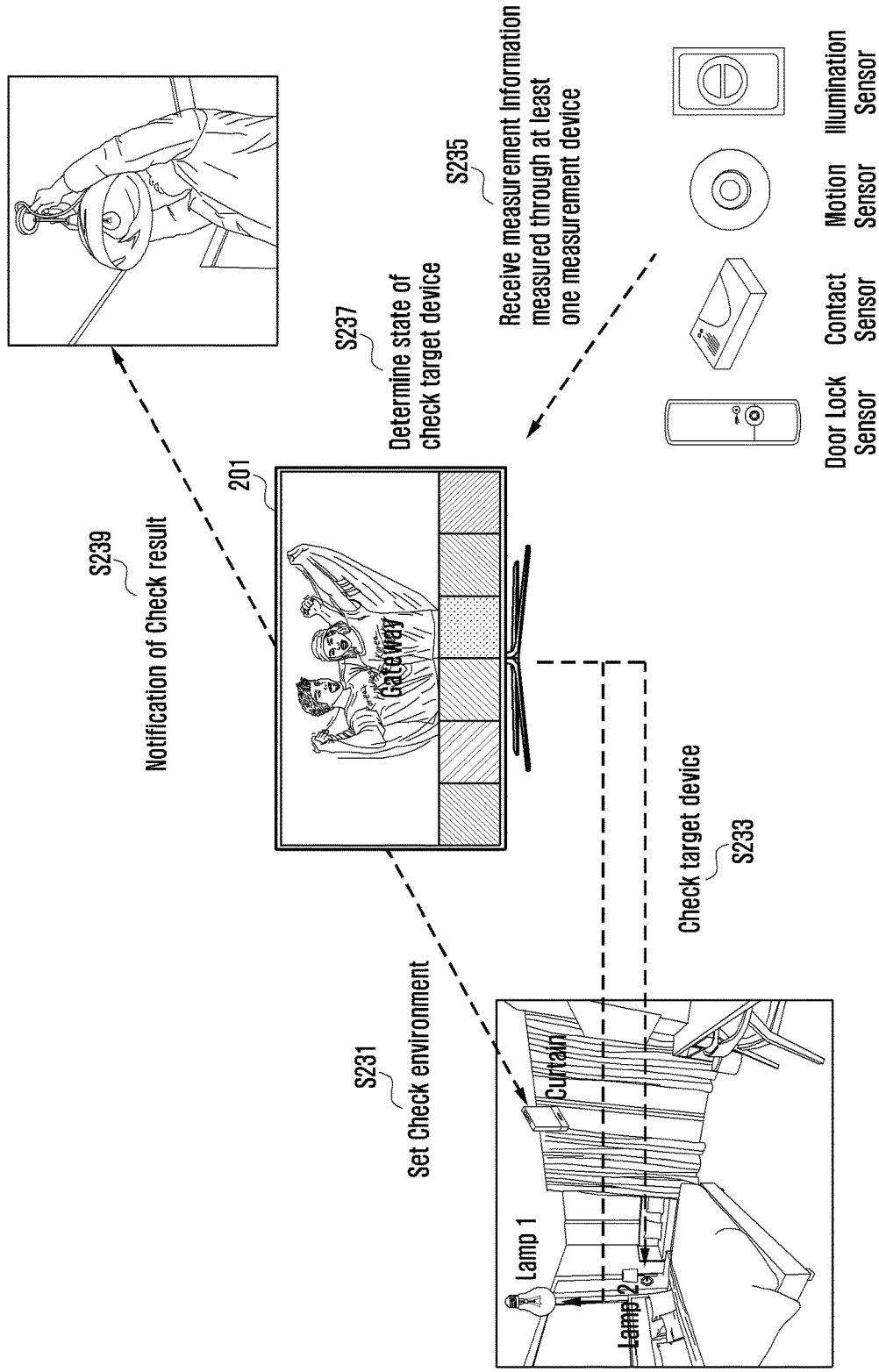
FIG. 2D is a diagram illustrating an example method for managing a device using at least one measurement device according to an example embodiment of the present disclosure.

FIG. 2D is a diagram illustrating an example measurement environment setting and the subsequent process according to an example embodiment of the present disclosure.

Referring to FIG. 2D, the electronic device 201 may set the management target devices, measurement parameters, and the measurement devices.

Thereafter, at operation S231, the electronic device 201 may set the measurement environment to improve reliability and accuracy in managing the management target device. In this example, the electronic device 201 may set the measurement environment based on the characteristics of the set management target device.

In the drawing, an example of lamp management is illustrated. In order to determine the state of a lamp, it is preferable to block external light, and the electronic device 201 may operate to close a window and a curtain.

In the case of managing a temperature control device, the electronic device 201 may operate to close the window and not to operate a ventilation fan.

On the other hand, the electronic device 201 may selectively perform the measurement environment setting based on the characteristics of the management target device. For example, in the case where a management target device that is not affected by the external environment is selected or the measurement environment setting is impossible, the electronic device 201 may not perform setting of the measurement environment.

At operation S233, the electronic device 201 may control the management target device to measure the state of the management target device. For example, in the case where plural lamps are located in a predetermined space, the electronic device may operate to turn on the lamps to be managed and to turn off the remaining lamps.

Further, at operation S235, the electronic device 201 receives measurement information that is measured through at least one measurement device. If the measurement environment is not set, the electronic device 201, at operation S237, may determine the state of the management target device using at least one piece of measurement information that is received through at least one first measurement device set.

However, if the measurement environment is set, the electronic device may determine the state of the management target device using the measurement information that is received through partial measurement devices selected from the first measurement device set.

For example, the electronic device may generate the device state information by adaptively combining the measurement information that is received through the at least one measurement device, and may determine the state of the management target device. Further, if one measurement device is included in the first measurement device set, the electronic device may determine the state of the management target device using the measurement information that is received through the one measurement device both in a state where the measurement environment is set and in a state where the measurement environment is not set.

Further, at operation S239, the electronic device 201 may notify the manager of the management result.

The operations S235 to S239 correspond to the operations S240 to S250 in FIG. 2A, and thus the detailed explanation thereof will be omitted.

Hereinafter, a method for managing the state of the management target device based on the detailed management target device will be described.

Figure 3A:
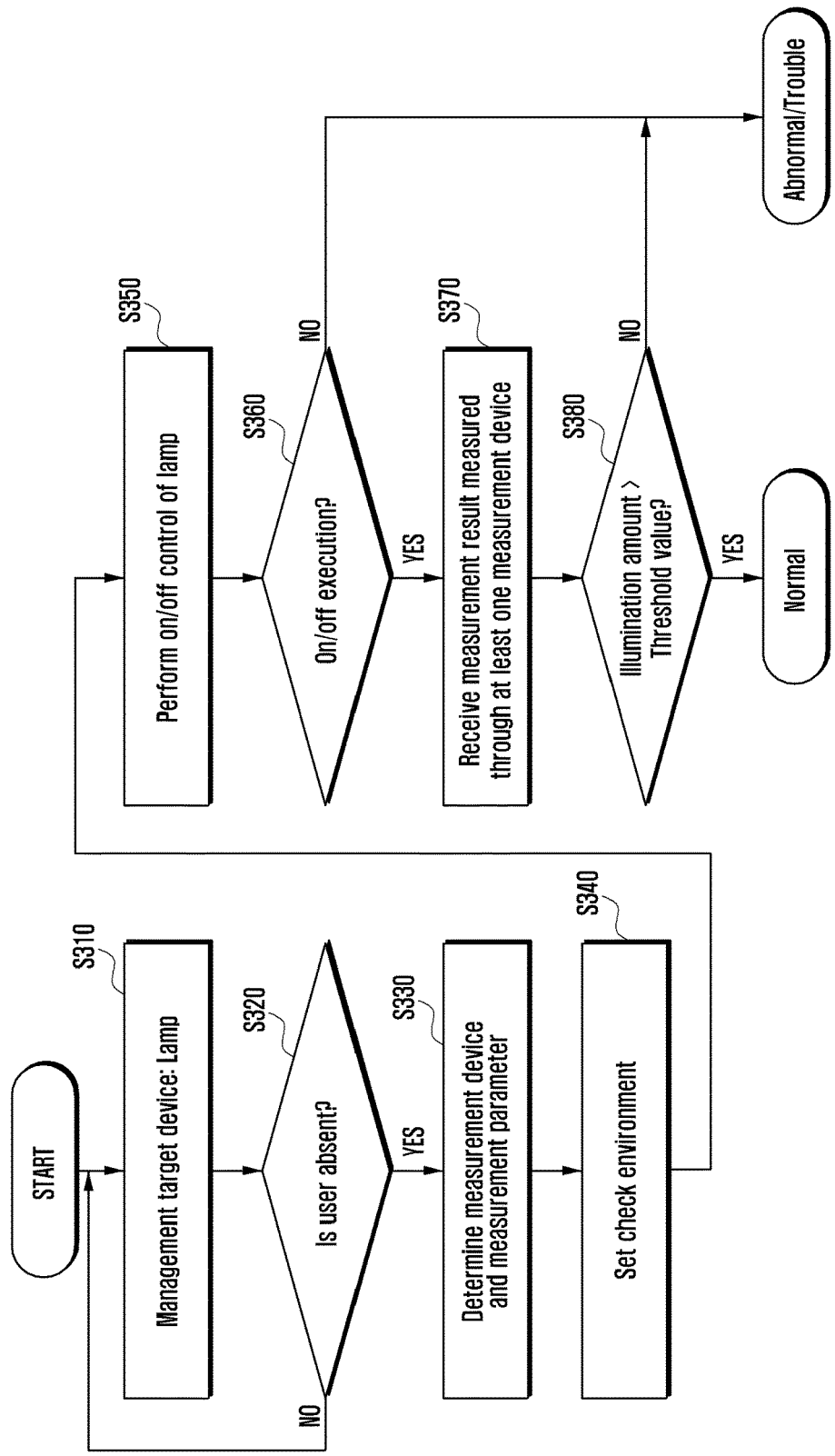
FIG. 3A is a flowchart illustrating an example method for managing an illumination device (lamp) using at least one measurement device according to a first example embodiment of the present disclosure.

FIG. 3A is a flowchart illustrating an example method for managing an illumination device (lamp) using at least one measurement device according to a first example embodiment of the present disclosure.

Referring to FIG. 3A, at operation S310, the electronic device may select an illumination device (lamp) (e.g., a living room fluorescent lamp, a bedroom fluorescent lamp, a bedroom sleeping lamp, or a bathroom incandescent lamp) that is located in a certain space as a management target device. As described above, in the present disclosure, a lamp will be described as an example of an illumination device.

The electronic device may select a lamp as a management target device based on a manager's input, and if an environment for lamp management is satisfied (e.g., if a user is absent and a window and a curtain are closed), the electronic device may determine the lamp as the management target device. Further, the electronic device may determine a lamp replacement period through a replacement history for each lamp, and may select the lamp of which the replacement period arrives as the management target device.

At operation S320, the electronic device that has selected the management target device may determine whether a user is absent in a space in which the electronic device is located. The space in which the electronic device is located may include, for example, a certain space in a hotel and an office in a company.

The reason why to determine whether the user is absent is that it is necessary for the electronic device to control the management target device and a device connected to the electronic device when the electronic device sets a measurement environment and manages the management target device. In the case where the electronic device controls the above-described devices while the user is in the space, the user may feel inconvenience, and thus the electronic device may manage the state of the lamp at a time when the user is absent.

The electronic device may determine whether the user is absent using a doorway open/close sensor and/or a motion sensor located in the space. Further, the electronic device may determine whether the user is absent using the current time information.

For example, in the case of a hotel, the electronic device may confirm whether the user is currently absent in the certain space through comparison of the current time with a checkout time and a check-in time.

However, confirmation of whether the user is absent may be selectively performed based on the management target device. For example, the electronic device may not confirm whether the user is absent in the case where a checking process for checking, for example, whether a battery of a management target device that is operated by the battery should be replaced, does not cause inconvenience to the user.

Further, the electronic device may perform a next operation without confirming whether the user is absent regardless of the kind of the management target device. For example, the electronic device may perform the checking of the management target device in the case where the electronic device receives measurement information on a speaker or a temperature control device even in a situation where the user is in the space.

For example, the operation S320 for determining whether the user is absent may be selectively performed.

At operation S330, the electronic device may determine measurement parameters that may have an effect on the state determination of the lamp, and may determine at least one measurement device for measuring the measurement parameters. For example, the electronic device may determine an illumination sensor for measuring the illumination amount, a contact sensor for measuring the open/close state of the window, and a proximity sensor for sensing an obstacle between the sensor and the lamp as measurement devices.

Further, if two or more measurement devices are determined, the electronic device may determine the main measurement device and the sub-measurement device. For example, the electronic device may determine the illumination sensor as the main measurement sensor, and may determine the window contact sensor and the proximity sensor as the sub-measurement devices.

Further, the electronic device may determine weight values for the above-described measurement devices in the same manner as described above.

At operation S340, the electronic device may set the measurement environment for managing the state of the lamp.

In order to determine the state of the lamp, it may be required to determine the illumination amount of the lamp, and the measurement device should not be affected by an external light source. Accordingly, the electronic device may determine whether an external light source exists, and if it is determined that the external light source exists, the electronic device may block the external light source. In this case, the electronic device may use information on an additional device that corresponds to each of the management target devices in order to set the measurement environment. The information on the additional device may be stored in the electronic device or may be received from a server.

For example, if the lamp is the management target device, the electronic device may set the measurement environment by controlling a light source blocking device (curtain) that is an additional device corresponding to the lamp.

However, in a situation where the measurement environment setting is impossible, the electronic device may omit the measurement environment setting process.

At operation S350, the electronic device may operate to turn on/off the lamp.

Further, at operation S360, the electronic device may determine whether the lamp is turned on/off under the operation of the electronic device. If the lamp is not turned on/off, the electronic device determines that the lamp is in an abnormal state, and may notify the manager of this.

On the other hand, if the lamp is normally turned on/off, the electronic device, at operation S370, may receive the measurement information that is measured through at least one measurement device. In this example, the electronic device may receive the measurement information that is measured through the at least one measurement device for a predetermined time. Further, the electronic device may control the management target device for the measurement.

Further, the electronic device may determine the device state information for determining the state of the management target device by adaptively combining the measurement information.

As described above, the electronic device may determine the device state information using the whole or a part of the measurement information.

For example, the electronic device may determine the device state information by reflecting the weight value for each measurement device in the measurement information. In this case, determination of the device state information through reflection of the weight value for each measurement device in the measurement information is the same as that as described above, and thus the detailed explanation thereof will be omitted.

According to the method for determining the device state information, for example, in order to measure the illumination of the lamp, the electronic device may receive the illumination amount that is measured using the illumination sensor, the window open/close state that is measured using the proximity sensor and the contact sensor, and the measurement information that is related to the obstacle existence/nonexistence state between the sensor and the lamp. The electronic device that has received the measurement information may determine the device state information of the management target device by reflecting the weight value in the measurement information. In this embodiment, the device state information may mean the illumination amount of the lamp that is calculated through reflection of the weight value in the measurement information.

However, in the case where the measurement environment is set, the electronic device may select a part of the at least one measurement device that is selected in the case where the measurement environment is not set, and may determine the device state information using only the measurement information that is received through the selected part of the measurement devices.

Further, at operation S380, the electronic device may determine whether the illumination amount that is measured for a predetermined time and is included in the device state information is larger than a predetermine threshold value. If it is determined that the illumination amount is larger than the predetermined threshold value, the electronic device determines that the lamp is in a normal state. On the other hand, if it is determined that the determined illumination amount is smaller than the predetermined threshold value, the electronic device determines that the lamp is in an abnormal state, and notifies the manager of this.

Figure 3B:
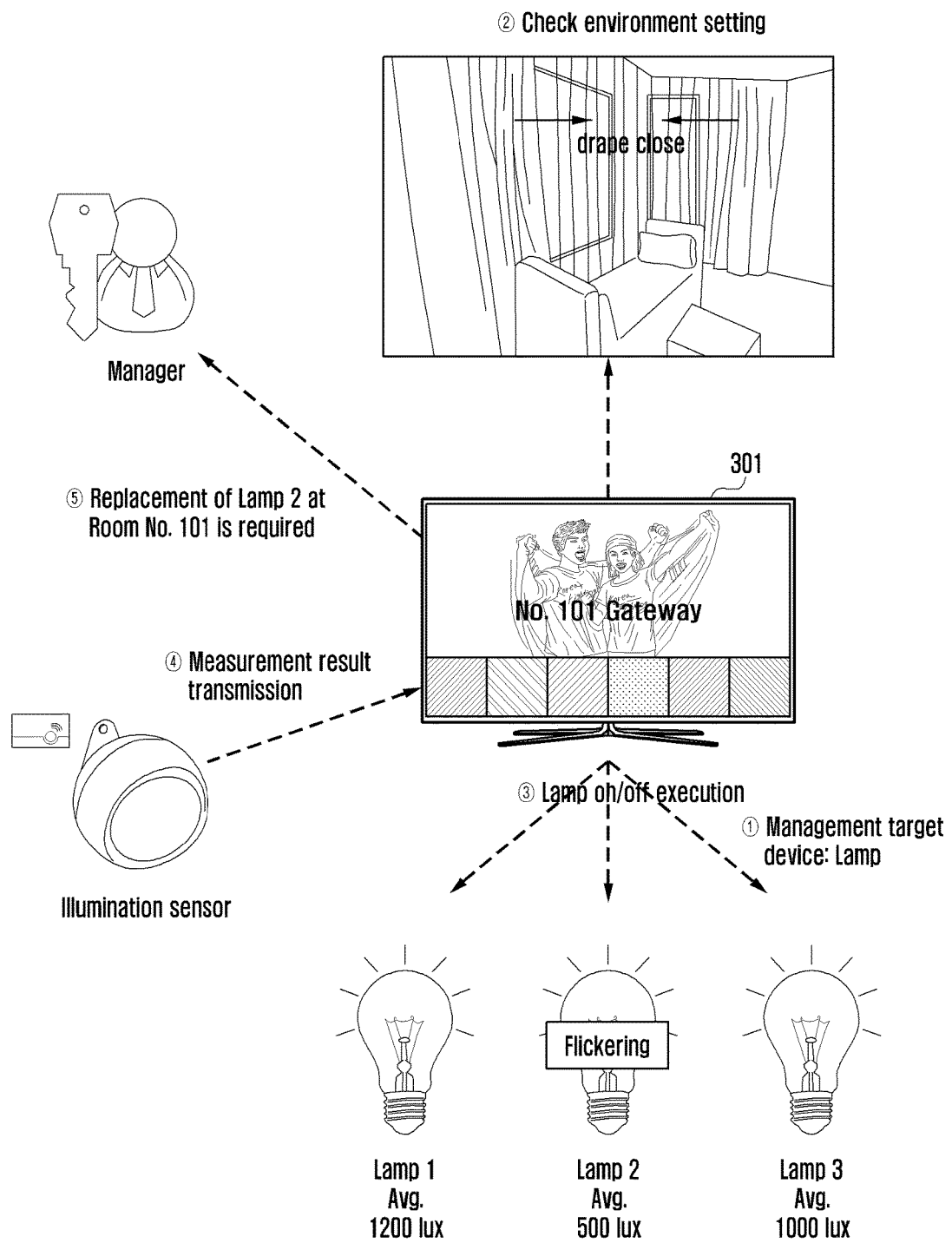
FIG. 3B is a diagram illustrating an example method for managing a lamp using at least one measurement device according to a first example embodiment of the present disclosure.

FIG. 3B is a diagram illustrating an example method for managing an illumination device (lamp) using at least one measurement device according to a first example embodiment of the present disclosure.

An electronic device 301 may select a lamp as a management target device, and may set one or more measurement devices for state determination of the lamp. For example, the electronic device 301 may set an illumination sensor, a contact sensor, and a proximity sensor as measurement devices. Further, the electronic device 301 may set the illumination sensor as a main measurement device, and may set the contact sensor and the proximity sensor as sub-measurement devices.

Thereafter, the electronic device 301 may block an external light source to set the measurement environment. Further, the electronic device 301 may determine whether the corresponding lamp is normally operated by turning on/off the lamp.

If it is determined that the corresponding lamp is normally operated, the electronic device 301 may determine the state of the lamp using the measurement information that is received through the at least one measurement device set as above.

However, in this case, the electronic device may adaptively select a part of the measurement information that is received through the at least one measurement device in accordance with surrounding environments (external environment and internal environment), and may generate the device state information through combination thereof.

Further, the electronic device may generate the device state information by reflecting a weight value for each measurement device in the received measurement information.

For example, the electronic device receives illumination amount information that is measured through the illumination sensor, information on whether a window is opened or closed that is measured through the contact sensor, and information on whether an obstacle exists between the lamp and the illumination sensor through the proximity sensor. Further, the electronic device may generate the device state information by combining the information.

However, in the case of managing the lamp at night, the open/close state of a window may not have a great effect on the measurement of the illumination amount of the lamp. Accordingly, the electronic device may omit the information, generate the device state information, and determine the state of the lamp.

Further, if the measurement environment is set, the electronic device may select a part of the at least one measurement device that is selected in the case where the measurement environment is not set, and may generate the device state information using the measurement information that is received through the selected part of the measurement devices.

The electronic device that has generated the device state information may confirm whether the lamp is in an abnormal state by confirming whether the illumination amount that is included in the device state information is maintained over a predetermined time and whether the illumination amount exceeds a predetermined threshold value. In this case, if the illumination amount is not maintained to be larger than the threshold value over the predetermined time, or if an average of the illumination amount is smaller than the threshold value, the electronic device may determine that the lamp is in an abnormal state.

According to an example embodiment of the present disclosure, the illumination amounts of lamp 1 and lamp 3 are 1200 lux and 1000 lux in average, which exceed the threshold value of 700 lux, and thus the electronic device may determine that lamp 1 and lamp 3 are in a normal state.

On the other hand, the illumination amount of lamp 2 is 500 lux in average, which is smaller than the threshold value of 700 lux, and thus the electronic device may determine that lamp 2 is in an abnormal state and may notify the manager that replacement or repair of lamp 2 is required.

Figure 4A:
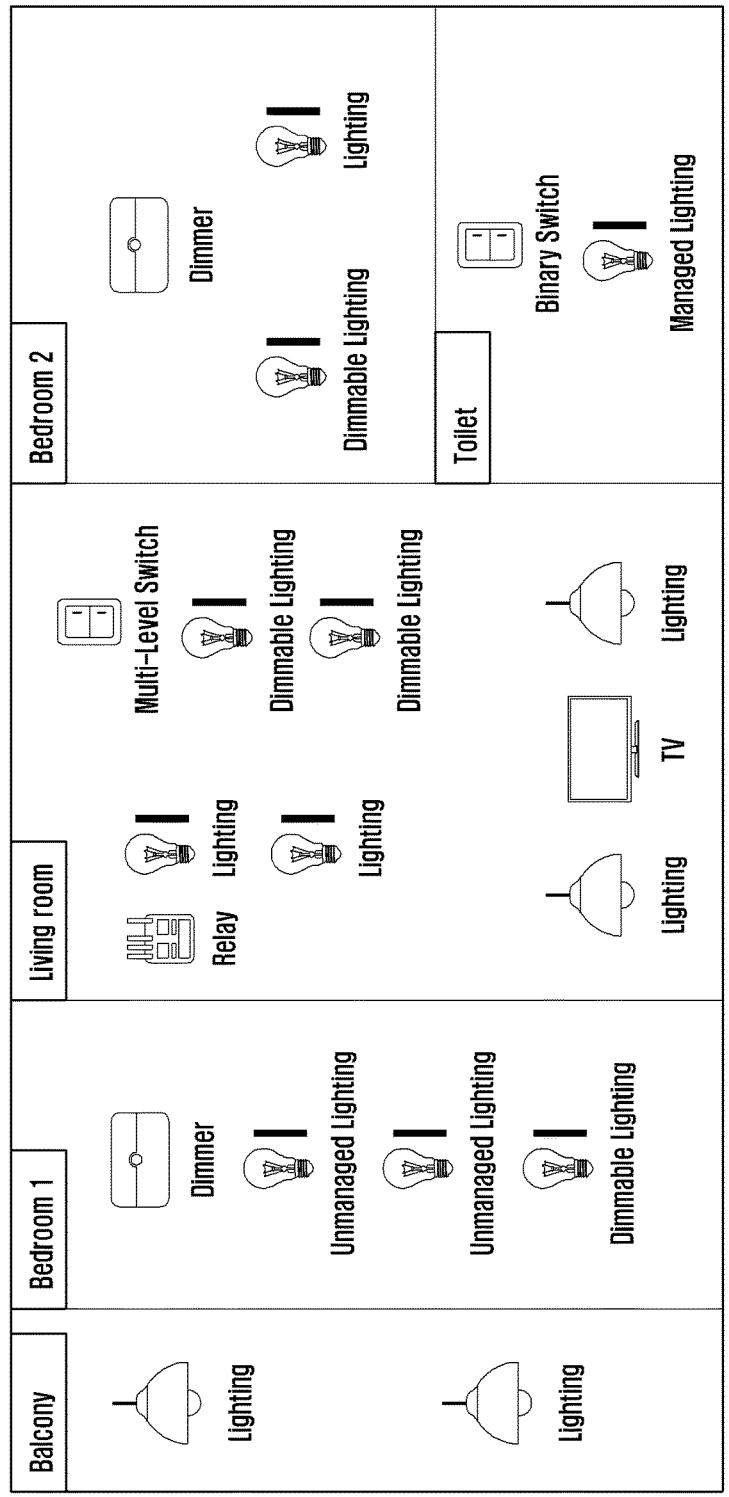
FIG. 4A is a diagram illustrating another example method for managing an illumination device (lamp) using at least one measurement device according to a first example embodiment of the present disclosure.

FIG. 4A is a diagram illustrating another example method for managing an illumination device (lamp) using at least one measurement device according to a first example embodiment of the present disclosure.

Referring to FIG. 4A, in general, plural lamps may be located in a predetermined space. For example, in the case of a hotel, plural lamps may be located in a room (e.g., bedroom 1, bedroom 2), a bathroom, and a living room that are provided in a certain space.

In this case, a lot of time and energy may be consumed for the electronic device to determine whether all lamps are in an abnormal state one by one. Accordingly, as illustrated in the drawing, a method for managing a lamp through division of the predetermined space into areas is proposed.

FIG. 4A illustrates an example method for managing an illumination device (lamp) through division of a certain space into a bathroom, a living room, a bedroom 1, a bedroom 2, and a balcony.

Figure 4B:
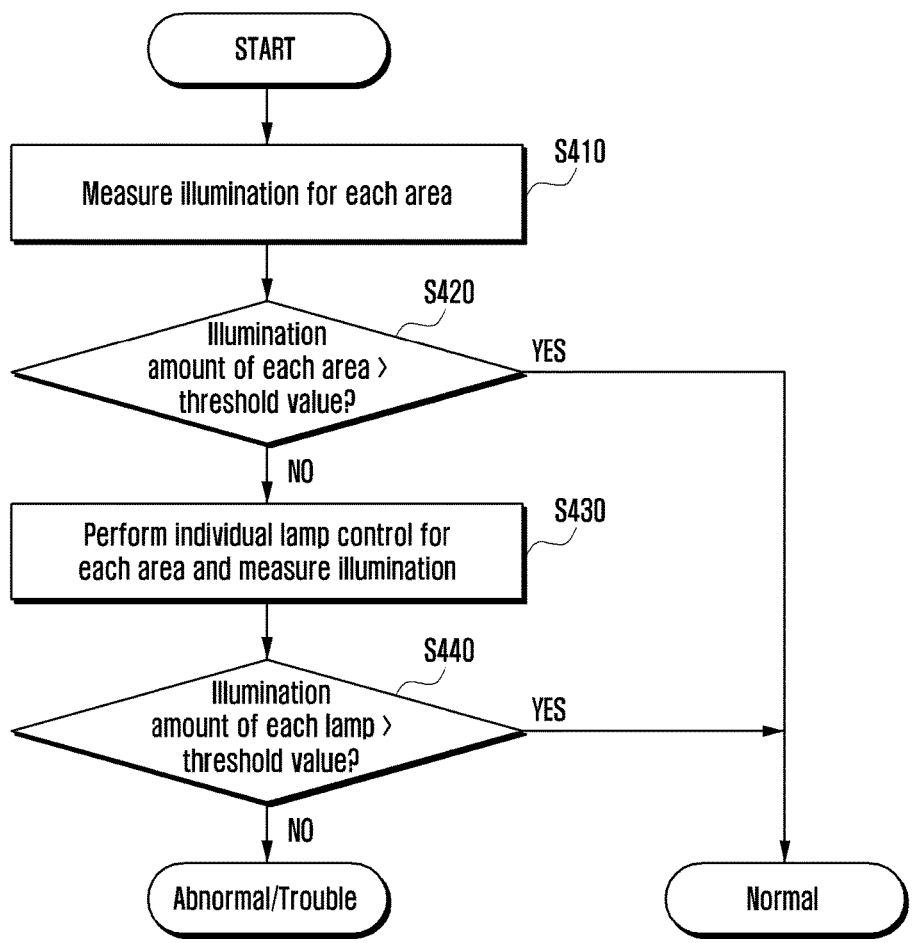
FIG. 4B is a flowchart illustrating an example method for managing an illumination device (lamp) through division of an area according to a first example embodiment of the present disclosure.

FIG. 4B is a flowchart illustrating an example method for managing an illumination device (lamp) through division into areas according to a first example embodiment of the present disclosure.

Referring to FIG. 4B, at operation S410, the electronic device may measure illumination in each area using, for example, an illumination sensor.

At operation S420, the electronic device that has measured the illumination by areas may determine whether the illumination amount for each area exceeds the predetermined threshold value. In this example, the electronic device may determine whether the lamp that is located in the corresponding area is in an abnormal state by determining whether the illumination amount for each area is maintained to be equal to or larger than the threshold value over the predetermined time or whether an average of the illumination amount exceeds the threshold value.

If it is determined that the illumination amount for each area exceeds the predetermined threshold value over the predetermined time, or the average of the illumination amount exceeds the threshold value, the electronic device may determine that the lamp included in the area is in a normal state.

On the other hand, if the illumination amount for a specific area does not exceed the predetermined threshold value for the predetermined time or the average of the illumination amount does not exceed the threshold value, the electronic device may determine that any one of the lamps that are located in the area is in an abnormal state.

Accordingly, at operation S430, the electronic device may individually control the lamp included in the specific area, and may measure the illumination amount for the individual lamp. If there is a lamp that is not normally controlled among the lamps included in the specific area, the electronic device may determine that the lamp is in an abnormal state, and may notify the manager of this.

On the other hand, if the lamps included in the specific area are normally controlled in all, the electronic device, at operation S440, may determine whether the lamp is in an abnormal state by comparing the illumination amount for an individual lamp with the predetermined value. In the same manner as at operation S420, the electronic device may determine whether the lamp is in an abnormal state by determining whether the illumination amount for each lamp exceeds the predetermined threshold value over the predetermined time, or whether the average of the illumination amount exceeds the threshold value.

If the illumination amount for the specific lamp is smaller than the predetermined threshold value, the electronic device may determine that the specific lamp is in an abnormal state, and may notify the manager of this.

As described above, by managing the lamps through division by areas, management time is reduced, and an energy usage amount that occurs due to an automatic management is reduced.

Figure 5A:
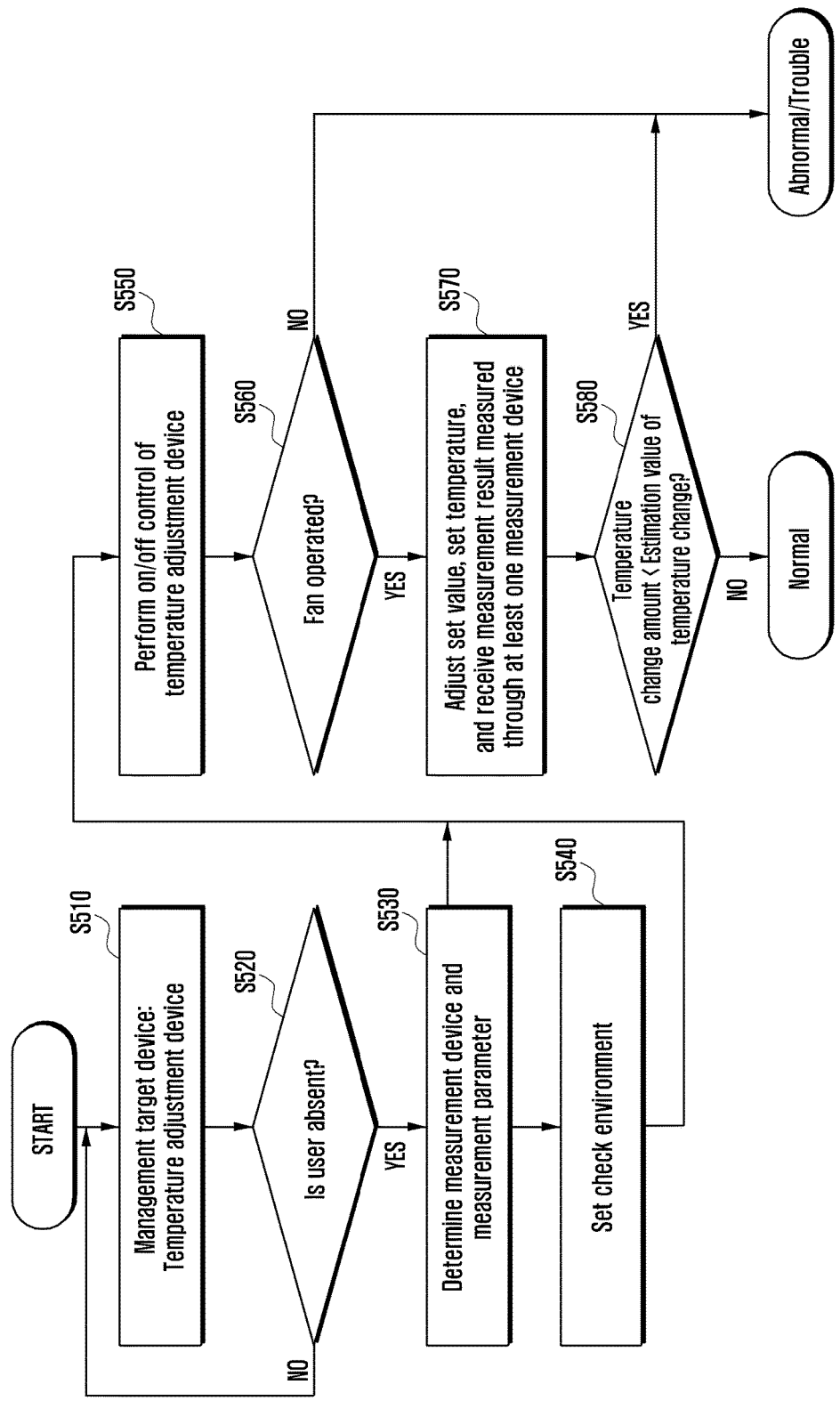
FIG. 5A is a flowchart illustrating an example method for managing a temperature control device using at least one measurement device according to a second example embodiment of the present disclosure.

FIG. 5A is a flowchart illustrating an example method for managing a temperature control device using at least one measurement device according to a second example embodiment of the present disclosure.

Referring to FIG. 5A, at operation S510, the electronic device may select the temperature control device as the management target device.

The electronic device may select the temperature control device as the management target device based on the manager's input, and if an environment for managing the temperature control device is satisfied (e.g., if a user is absent, a window and a curtain are closed, and a ventilation fan is turned off), the electronic device may determine the temperature control device as the management target device. Further, the electronic device may determine a temperature control device replacement or repair period through a replacement or repair history for each temperature control device, and may select the temperature control device of which the replacement period arrives as the management target device.

At operation S520, the electronic device that has selected the management target device may determine whether a user is absent in a space in which the electronic device is located. The space in which the electronic device is located may include, for example, a certain space in a hotel and an office in a company.

The reason for determining whether the user is absent is the same as that as described above with reference to FIG. 3, and thus the detailed explanation thereof will be omitted. However, as described above, the electronic device may determine the state of the management target device even in the case where the user is in the space. For example, the step S520 for determining whether the user is absent may be selectively performed.

At operation S530, the electronic device may determine measurement parameters that may have an effect on the state determination of the temperature control device, and may determine at least one measurement device for measuring the measurement parameters.

For example, the electronic device may determine an indoor temperature change amount, a window open/close state, and indoor air flow, which may have an effect on the temperature, as measurement parameters, and may determine a temperature sensor, a contact sensor, and a wind detection sensor for measuring the measurement parameters as measurement devices.

Further, if two or more measurement devices are selected, the electronic device may determine the main measurement device and the sub-measurement devices. For example, the electronic device may determine the temperature sensor as the main measurement device, and may determine the contact sensor and the wind detection sensor as the sub-measurement devices. Further, the electronic device may determine weight values for the measurement devices.

Thereafter, at operation S540, the electronic device may set a measurement environment for managing the state of the temperature control device. In determining the state of the temperature control device, an accurate result may be obtained by measuring the temperature in a state where it is not affected by the external environment. Accordingly, at operation S540, the electronic device may set the measurement environment so that it is not affected by the external environment by closing the window and the curtain and turning off the ventilation fan. In this case, the electronic device may use information on additional devices that correspond to the respective management target devices to set the measurement environment. The information on the additional devices may be stored in the electronic device or may be received from the server.

For example, if the temperature control device is the management target device, the electronic device may set the measurement environment by controlling the additional device that corresponds to the temperature control device. The additional device that corresponds to the temperature control device may be called an external air blocking device, and may include the window, the curtain, and the ventilation fan.

However, in a situation where the measurement environment setting is impossible, the measurement environment setting operation may be omitted.

At operation S550, the electronic device may perform on/off control of the temperature control device to determine the state of the temperature control device.

If the temperature control device is in an on state, the electronic device, at operation S560, may determine whether a fan of a device that is operated through the temperature control device is operated. For example, the device that is operated through the temperature control device may include an air conditioner or a ventilation fan of a Heating, Ventilation and Air Conditioning (HVAC) system. If the fan is not operated in a state where the temperature control device is turned on, the electronic device may determine that the temperature control device is in an abnormal state, and may notify the manager of this.

On the other hand, if the fan of the temperature control device is normally operated, the electronic device, at operation S570, may adjust a set value (hereinafter a set value and a set point may be used interchangeably) of the temperature control device, and may receive the measurement information that is measured using at least one measurement device. In this case, the electronic device may determine the device state information by reflecting weight values for measurement devices in the measurement information. In this example embodiment, the device state information may refer, for example, to a temperature change amount.

For example, the electronic device may receive may receive measurement information on the temperature change that is measured through the temperature sensor, the window open/close state that is measured through the contact sensor, and the indoor air flow that is measured through the wind detection sensor. The electronic device may determine the temperature change amount of the temperature control device by reflecting the weight values for the measurement devices in the measurement information.

However, if the measurement environment is set, the electronic device may select a part of the at least one measurement device that is selected in the case where the measurement environment is not set, and may determine the temperature change amount using the received measurement information that is measured through the selected part of the measurement devices.

At operation S580, the electronic device compares the temperature change amount with a temperature change estimation value that is estimated to be changed through adjustment of the set value. The temperature change estimation value may be determined by the measurement information that is received by the measurement devices and external environment parameters. The detailed contents thereof will be described later.

If it is determined that the temperature change amount is smaller than the temperature change estimation value as the result of the comparison, the electronic device determines that the temperature control device is in an abnormal state, and may notify the manager of this.

On the other hand, if it is determined that the temperature change amount is larger than the temperature change estimation value, the electronic device determines that the temperature control device is in a normal state.

Figure 5B:
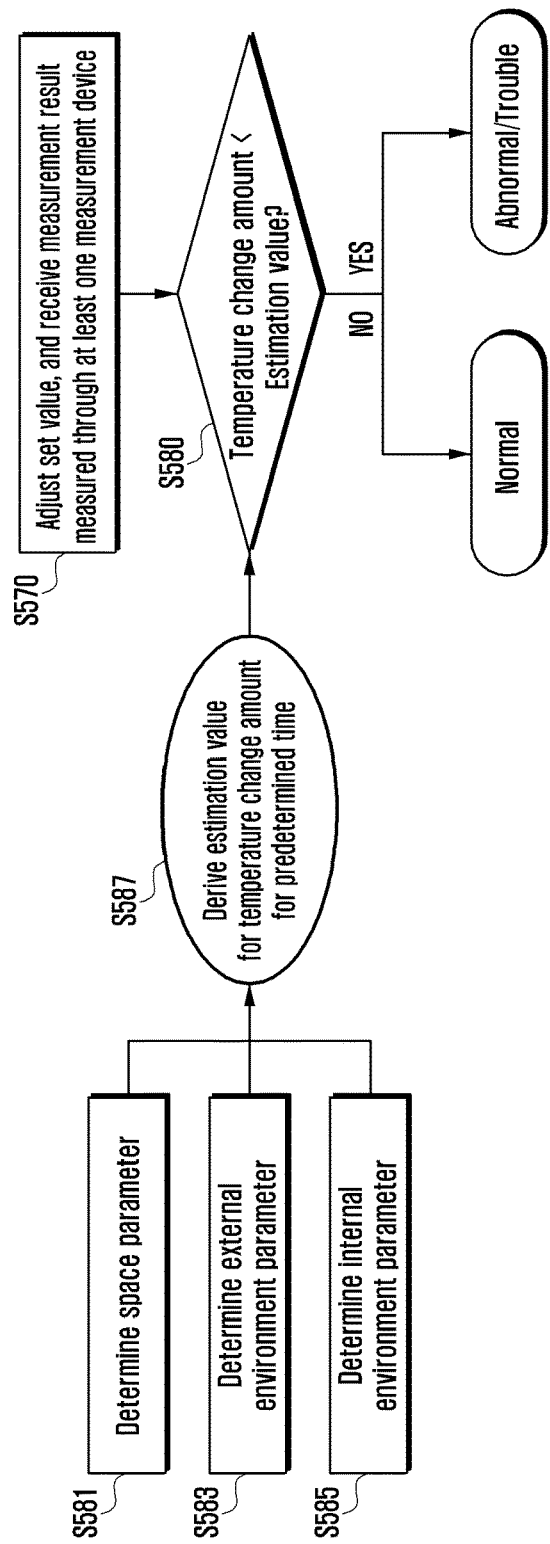
FIG. 5B is a diagram illustrating an example process of determining a temperature change estimation value according to a second example embodiment of the present disclosure.

FIG. 5B is a diagram illustrating an example process of determining a temperature change estimation value according to a second example embodiment of the present disclosure.

Referring to FIG. 5B, at operation S581, the electronic device may determine parameters (hereinafter referred to as "space parameters") that are related to the characteristics of a space in which the electronic device is located in order to determine the temperature change estimation value.

For example, in the case of a hotel, the electronic device may consider parameters, such as a direction, a size, a width, and the number of floors of a certain space in which the electronic device is located.

Further, at operation S583, the electronic device may determine parameters (hereinafter referred to as "external environment parameters") that are related to an external environment that has an effect on the temperature. For example, the external environment parameters may include external air temperature, humidity, and illumination.

Further, at operation S585, the electronic device may determine parameters (hereinafter referred to "internal environment parameters") that are related to the internal environment that exerts an influence on the temperature. For example, the internal environment parameters may include window open/close state, and indoor air flow.

At operation S587, the electronic device may derive an estimation value (hereinafter referred to as "temperature change estimation value") for the temperature change amount for a predetermined time using the determined space parameter, the external environment parameter, the internal environment parameter, and the adjusted set value. Accordingly, at operation S580, the electronic device may determine whether the temperature control device is in an abnormal state by comparing the temperature change amount that is determined through the received measurement information at operation S570 with the determined temperature change estimation value.

Figure 5C:
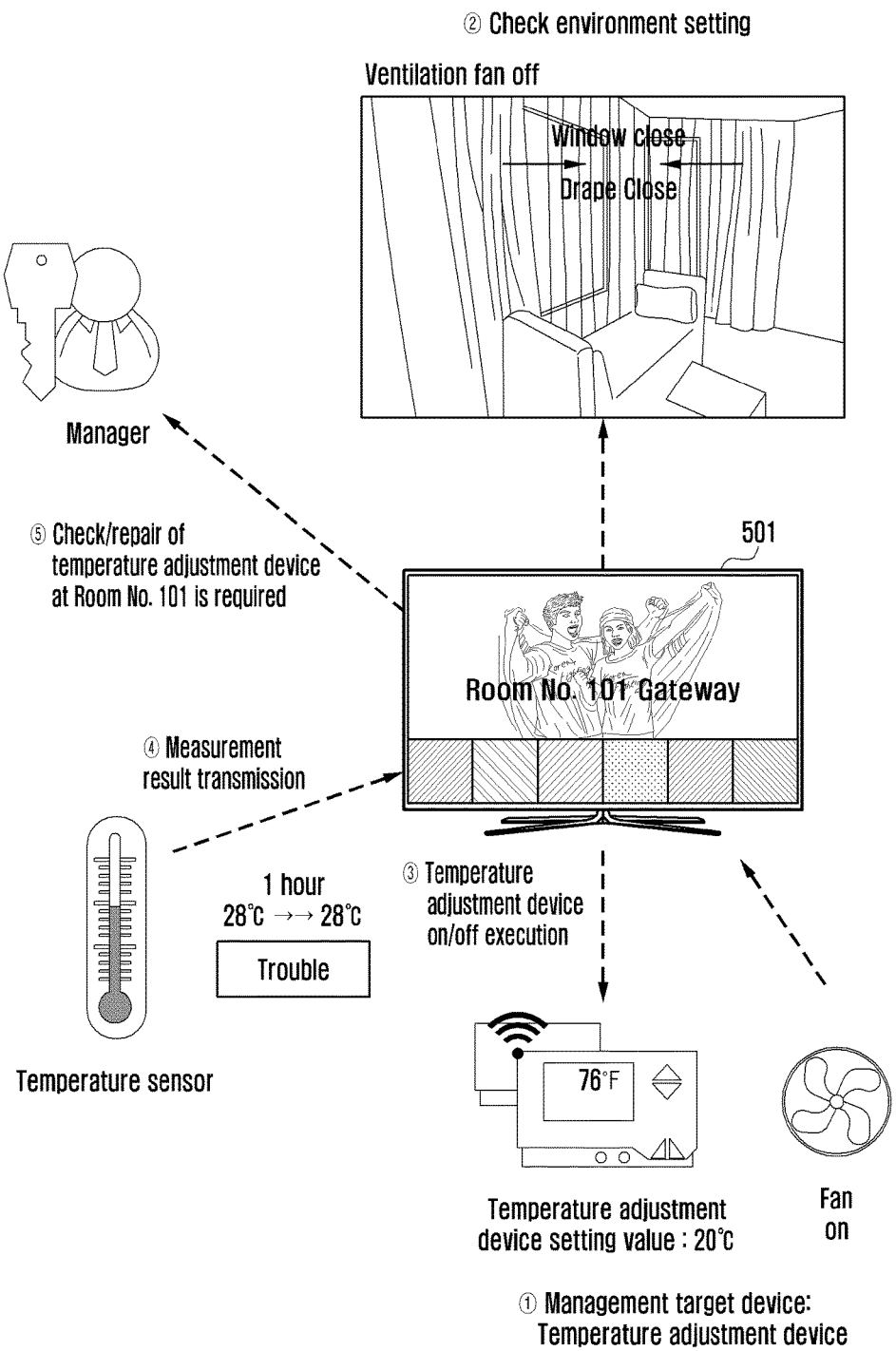
FIG. 5C is a diagram illustrating an example method for managing a temperature control device using at least one measurement device according to a second example embodiment of the present disclosure.

FIG. 5C is a diagram illustrating an example method for managing a temperature control device using at least one measurement device according to a second example embodiment of the present disclosure.

An electronic device 501 may select a temperature control device as a management target device, and may determine at least one measurement device for state determination of the temperature control device. For example, the electronic device 501 may set a room temperature change amount, a window open/close state, and indoor air flow as measurement parameters, and may set a temperature sensor, a contact sensor, and a wind detection sensor as measurement devices.

Further, if two or more measurement devices are determined, the electronic device 501 may determine a main measurement device and sub-measurement devices. For example, the electronic device may set the temperature sensor as the main measurement device, and the contact sensor and the wind detection sensor as the sub-measurement devices.

Further, the electronic device 501 may block heat and air from an outside to set a measurement environment. Referring to FIG. 5C, the electronic device 501 may close a window and a curtain to block heat from an outside of a building, and may turn off a ventilation fan to block an air flow from the outside. However, the setting of the measurement environment as described above may be selectively applied.

The electronic device 501 may determine whether the temperature control device is in an abnormal state by determining whether a fan of the temperature control device is operated through an on/off execution of the temperature control device. For example, if the fan of the temperature control device is not operated, the electronic device 501 may determine that the temperature control device is in an abnormal state, and may notify the manager of this.

On the other hand, if the fan is normally operated, the electronic device 501 determines whether the temperature control device is in an abnormal state using a temperature change estimation value that is acquired through adjustment of the set value of the temperature control device and measurement information that is received through at least one measurement device. In this case, the electronic device may adaptively select a part or the whole of the measurement information that is received through the at least one measurement device in accordance with surrounding environments (external environment and internal environment), and may generate device state information through combination thereof.

Further, the electronic device may generate the device state information by reflecting weight values for measurement devices in the received measurement information.

For example, the electronic device 501 may set a set value of the temperature control device as 20° C. The electronic device may determine the estimation value in accordance with the temperature change amount for a predetermined time using the set value, a space parameter, an external environment parameter, and an internal environment parameter.

Further, the electronic device 501 may confirm the temperature change amount for a predetermined time by adaptively using the measurement information that is received through the at least one measurement device.

Accordingly, the electronic device 501 may determine whether the temperature control device is in an abnormal state by comparing the confirmed temperature change amount with the temperature change estimation value.

In an example embodiment of the present disclosure, the electronic device may set the set value as 20° C. and may receive the temperature change for one hour from the measurement device. Since the temperature received from the measurement device was 28° C. before a reference temperature setting, and then was 28° C. when one hour elapsed after the reference temperature setting, the electronic device may determine that the temperature change amount is 0° C. Accordingly, since the temperature change amount is smaller than the temperature change estimation value, the electronic device may determine that the temperature control device is in an abnormal state, and may notify the manager that replacement or repair of the temperature control device is required.

Figure 6A:
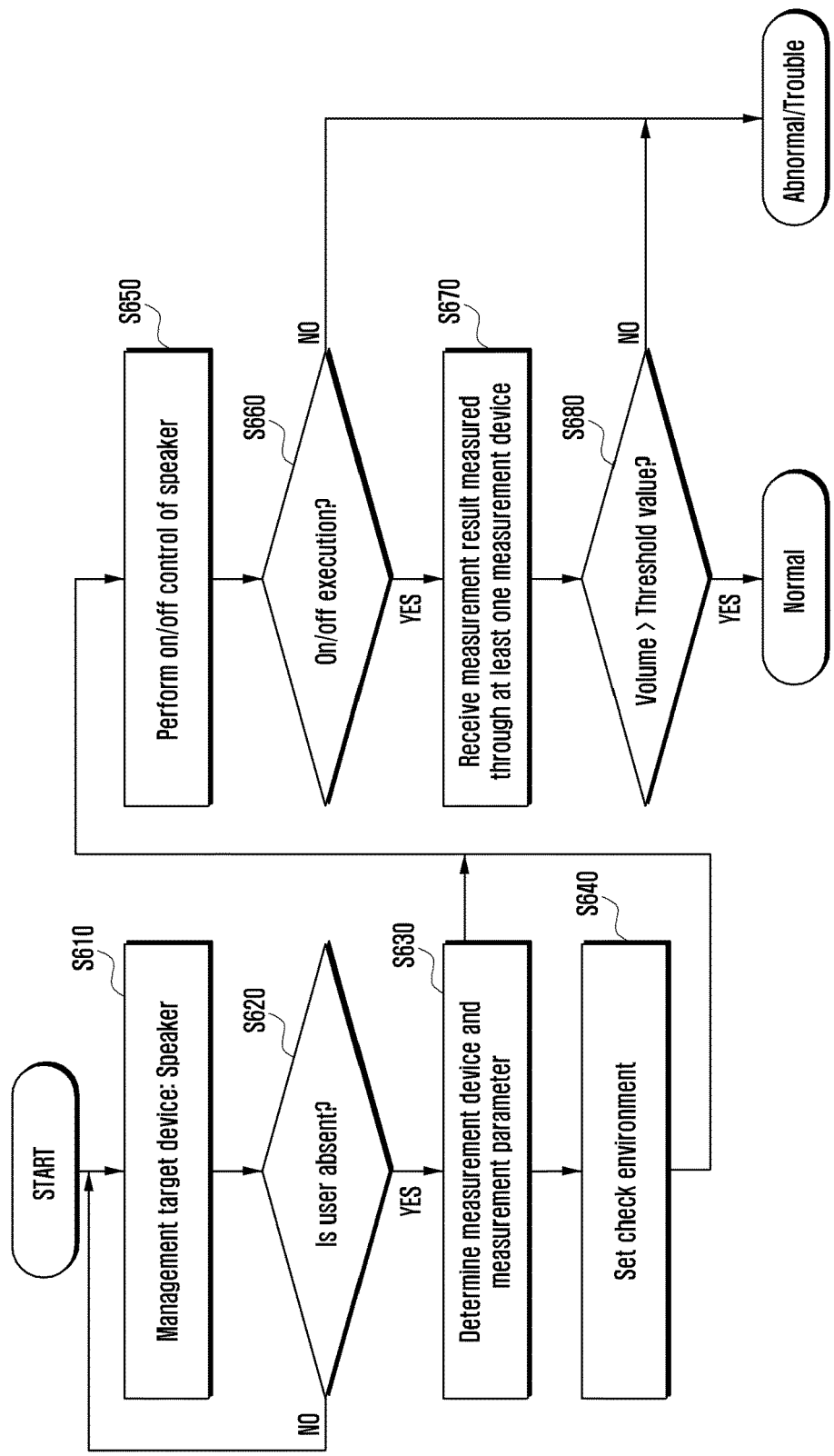
FIG. 6A is a flowchart illustrating an example method for managing a sound generation device (speaker) using at least one measurement device according to a third example embodiment of the present disclosure.

FIG. 6A is a diagram illustrating an example method for managing a sound generation device (speaker) using at least one measurement device according to a third example embodiment of the present disclosure.

Referring to FIG. 6A, at operation S610, the electronic device may select a sound generation device (speaker) as a management target device. In the present disclosure, as an example, the sound generation device may be a speaker, but the scope of the present disclosure is not limited thereto.

The electronic device may select the speaker as the management target device based on a manager's input, and if an environment for lamp management is satisfied (e.g., a user is absent and a window and a front door are closed), the electronic device may determine the speaker as the management target device. Further, the electronic device may determine a speaker replacement or repair period through a speaker replacement or repair history and may select the speaker of which the replacement period arrives as the management target device.

At operation S620, the electronic device that has selected the management target device may determine whether a user is absent in a space in which the electronic device is located. The space in which the electronic device is located may include, for example, a certain space in a hotel and an office in a company.

The reason for determining whether the user is absent is the same as that as described above with reference to FIG. 3, and thus the detailed explanation thereof will be omitted. However, as described above, the electronic device may determine the state of the management target device even in the case where the user is in the space. For example, the operation S620 for determining whether the user is absent may be selectively performed.

At operation S630, the electronic device may determine measurement parameters that may have an effect on the state determination of the speaker, and may determine at least one measurement device for measuring the measurement parameters.

For example, the electronic device may determine a speaker volume, an obstacle between the speaker and the sensor, and a window open/close state as the measurement parameters, and may determine a sound sensor, a proximity sensor, and a contact sensor as the measurement devices. Further, if two or more measurement devices are determined, the electronic device may determine the main measurement device and the sub-measurement devices. For example, the electronic device may determine the sound sensor as the main measurement sensor, and may determine the proximity sensor and the contact sensor as the sub-measurement devices. Further, the electronic device may determine weight values for the measurement devices.

At operation S640, the electronic device may set the measurement environment for determining the state of the speaker. In order to accurately determine the state of the speaker, it is required that the measurement devices are not affected by external noise. Accordingly, the electronic device may set the measurement environment so that the measurement devices are not affected by the external environment by operating to close the curtain and the window to block the noise from an outside of a building. In this example, the electronic device may use information on an additional device that corresponds to each of the management target devices in order to set the measurement environment. The information on the additional device may be stored in the electronic device or may be received from a server.

For example, if the speaker is the management target device, the electronic device may set the measurement environment by controlling a sound blocking device that is the additional device corresponding to the speaker. The sound blocking device may include a curtain, a window, and a front door.

However, as described above, the measurement environment setting may be selectively applied.

At operation S650, the electronic device may operate to turn on/off the speaker so as to determine the state of the speaker.

At operation S660, the electronic device may determine whether the speaker is operated in accordance with the on/off control of the speaker. If the speaker is not operated in an on state, the electronic device determines that the speaker is in an abnormal state, and notifies the manager of this.

On the other hand, if the speaker is normally operated, the electronic device, at operation S670, may receive the measurement information that is measured through at least two measurement devices. In this example, the electronic device may control the speaker, and may receive the measurement information that is measured through the at least one measurement device for a predetermined time.

Further, the electronic device may determine information for determining the state of the speaker by adaptively combining the measurement information. For example, the electronic device may determine the device state information by reflecting the weight value for each measurement device in the measurement information. In this example, determination of the device state information through reflection of the weight value for each measurement device in the measurement information is the same as that as described above, and thus the detailed explanation thereof will be omitted.

For example, the electronic device may receive the volume measured through the sound sensor, the measurement information that is related to the obstacle existence/nonexistence state between the sound sensor and the speaker, which is measured by the proximity sensor, and the measurement information that is related to the window open/close state that is measured using the contact sensor. The electronic device that has received the measurement information may determine the device state information of the management target device by reflecting the weight value in the measurement information. In this example embodiment, the device state information may include a speaker volume or a volume change amount in accordance with the speaker control. However, in the case where the measurement environment is set, the electronic device may select a part of the at least one measurement device that is selected in the case where the measurement environment is not set, and may determine the speaker volume or the volume change amount based on the speaker control using the measurement information that is received through the selected part of the measurement devices.

Further, at operation S680, the electronic device may determine whether the speaker is in an abnormal state by comparing the measured volume or the volume change amount based on the speaker control with a predetermined threshold value.

If the measured volume or the volume change amount in accordance with the speaker control exceeds the predetermined threshold value, the electronic device determines that the speaker is in a normal state.

On the other hand, if it is determined that the measured volume or the volume change amount in accordance with the speaker control is smaller than the predetermined threshold value, the electronic device determines that the speaker is in an abnormal state, and notify the manager of this.

Further, the electronic device may determine whether the location of the speaker has been changed using the volume of the speaker. If it is determined that the location of the speaker has been changed by the user, the electronic device may notify the manager of this to let the manager to put the speaker in the original location during cleaning the certain space.

Figure 6B:
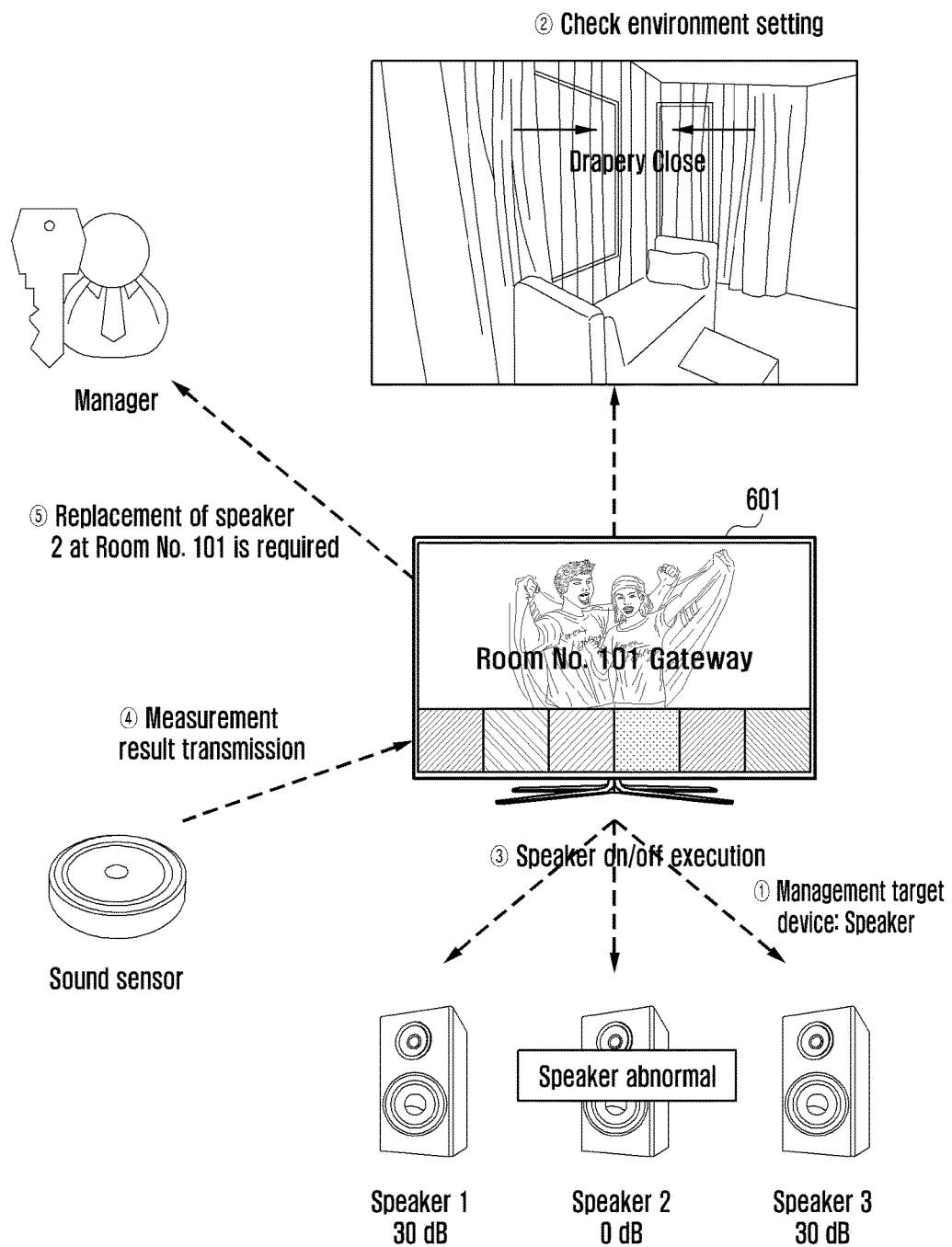
FIG. 6B is a diagram illustrating an example method for managing a sound generation device (speaker) using at least one measurement device according to a third example embodiment of the present disclosure.

FIG. 6B is a diagram illustrating an example method for managing a sound generation device (speaker) using at least one measurement device according to a third example embodiment of the present disclosure.

An electronic device 601 may select a speaker as a management target device, and may set one or more measurement devices for state determination of the speaker. For example, the electronic device 601 may set a sound sensor, a proximity sensor, and a contact sensor as measurement devices. Further, the electronic device 601 may set the sound sensor as a main measurement device, and may set the contact sensor and the proximity sensor as sub-measurement devices.

Then, the electronic device 601 may block noises from an outside to set the measurement environment. Referring to FIG. 6B, the electronic device 601 may operate to close a window and a curtain to block the noises from the outside of a building. However, the electronic device may perform the subsequent process without setting the measurement environment.

The electronic device 601 may determine whether the speaker is normally operated through an on/off execution of the speaker. For example, if the speaker is not operated, the electronic device may determine that the speaker is in an abnormal state, and may notify the manager of this.

On the other hand, if the speaker is normally operated, the electronic device 601 may determine the state of the speaker using the measurement information that is received through the at least one measurement device. However, the electronic device 601 may adaptively select a part of the measurement information that is received through the at least one measurement device in accordance with surrounding environments (external environment and internal environment), and may generate the device state information through combination thereof.

Further, the electronic device may generate the device state information by reflecting a weight value for each measurement device in the received measurement information.

For example, the electronic device may receive the volume that is measured through the sound sensor and information related to the obstacle existence/nonexistence state between the sensor and the speaker, which is measured through the proximity sensor. Further, the electronic device may generate the device state information using the above-described information.

In this example embodiment, the device state information may include the speaker volume or the volume change amount in accordance with the speaker control. The electronic device may confirm whether the speaker is in an abnormal state by confirming whether the speaker volume that is included in the device state information exceeds a predetermined threshold value.

On the other hand, the electronic device may determine the device state information using a part of the received measurement information in accordance with the environment of the place where the speaker is located. For example, if the window is closed, it is not necessary to confirm whether the window is opened or closed using the contact sensor, and thus the electronic device may determine the device state information using the part of the received measurement information (in this embodiment, measurement information that is received through the sound sensor and the proximity sensor).

According to an example embodiment of the present disclosure, an average volume of speaker 1 and speaker 3 may be 30 dB, and since this exceeds the threshold value of 20 dB, the electronic device may determine that speaker 1 and speaker 3 are in a normal state.

On the other hand, an average volume of speaker 2 may be 0 dB, and since this is lower than the threshold value of 20 dB, the electronic device may determine that speaker 2 is in an abnormal state, and may notify the manager that replacement or repair of speaker 2 is required.

Figure 7A:
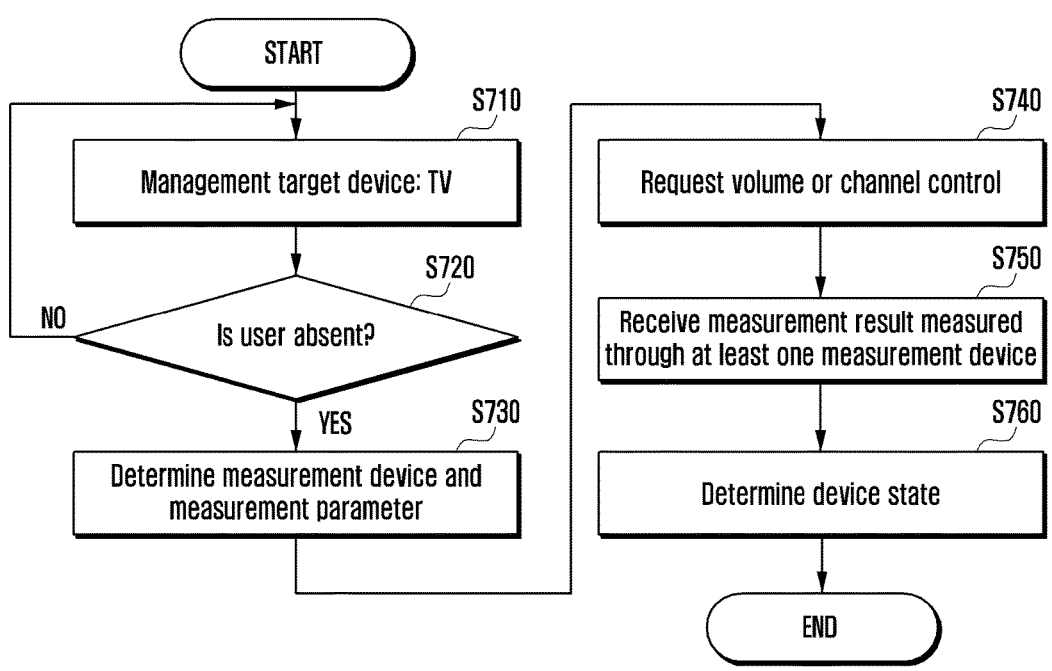
FIG. 7A is a flowchart illustrating an example method for managing a content display device (TV) using at least one measurement device according to a fourth example embodiment of the present disclosure.

FIG. 7A is a flowchart illustrating an example method for managing a content display device (TV) using at least one measurement device according to a fourth example embodiment of the present disclosure.

Referring to FIG. 7A, at operation S710, the electronic device may select a content display device (TV) as a management target device. In the present disclosure, as an example, the content display device is TV, but the embodiments of the present disclosure are not limited thereto.

The electronic device may select the TV as the management target device in accordance with a manager's input, and the electronic device may determine a TV replacement or repair period through a TV replacement or repair history and may select the TV of which the replacement period arrives as the management target device.

At operation S720, the electronic device that has selected the management target device may determine whether a user is absent in a space in which the electronic device is located. The space in which the electronic device is located may include, for example, a certain space in a hotel and an office in a company.

The reason for determining whether the user is absent is the same as that as described above with reference to FIG. 3, and thus the detailed explanation thereof will be omitted. However, as described above, the electronic device may determine the state of the management target device even in the case where the user is in the space. For example, the operation S720 for determining whether the user is absent may be selectively performed. At operation S730, the electronic device may determine measurement parameters that may have an effect on the state determination of the TV, and may determine at least one measurement device for measuring the measurement parameters.

For example, the electronic device may determine a volume change and a channel control operation, which may have an effect on the state determination of the TV, as the measurement parameters, and may determine a sound sensor for measuring the measurement parameters and a broadcasting information processing unit that is included in the TV as the measurement devices. In this example, a configuration for determining whether to perform a channel control operation may be included in the TV. In this example, the electronic device may determine a main measurement device and a sub-measurement device with respect to the determined measurement devices. For example, the electronic device may determine the sound sensor as the main measurement sensor, and may determine the broadcasting information processing unit that is included in the TV as the sub-measurement device.

The TV may set a measurement environment for determining the state of the TV. In order to determine the state of the TV, the electronic device may determine whether a volume of sound that is generated from the TV has been changed and whether channel control has been made. However, since the channel control operation is not affected by surrounding environments, the measurement environment may not be set. On the other hand, in order to determine whether the sound volume has been changed, the electronic device may set the measurement environment in a method that is similar to the method for setting the measurement environment to check the speaker. As described above, the electronic device may use information on an additional device that corresponds to each of the management target devices in order to set the measurement environment. The information on the additional device may be stored in the electronic device or may be received from a server. As the additional device that corresponds to the TV, a sound blocking device may be set in the same manner as the speaker.

Further, in a situation where the measurement environment setting is impossible, the electronic device may omit the measurement environment setting operation.

Thereafter, at operation S740, the electronic device may transmit a volume and channel control request command to the TV.

Further, at operation S750, the electronic device may receive measurement information for the request command through at least one measurement device.

For example, the electronic device may transmit the channel and volume control command to the TV. In this example, the electronic device may determine whether a response that is received from the broadcasting information processing unit corresponds to the same channel change that is expected in accordance with the channel control command that is transmitted by the electronic device. Further, the electronic device may compare the volume change that is expected in accordance with the volume control command with the volume change that is confirmed using the sound sensor.

At operation S760, the electronic device may determine whether the TV is in an abnormal state using the received measurement information.

However, the electronic device may transmit any one of the channel and volume control commands to the TV, and may determine the state of the TV through the corresponding response.

Figure 7B:
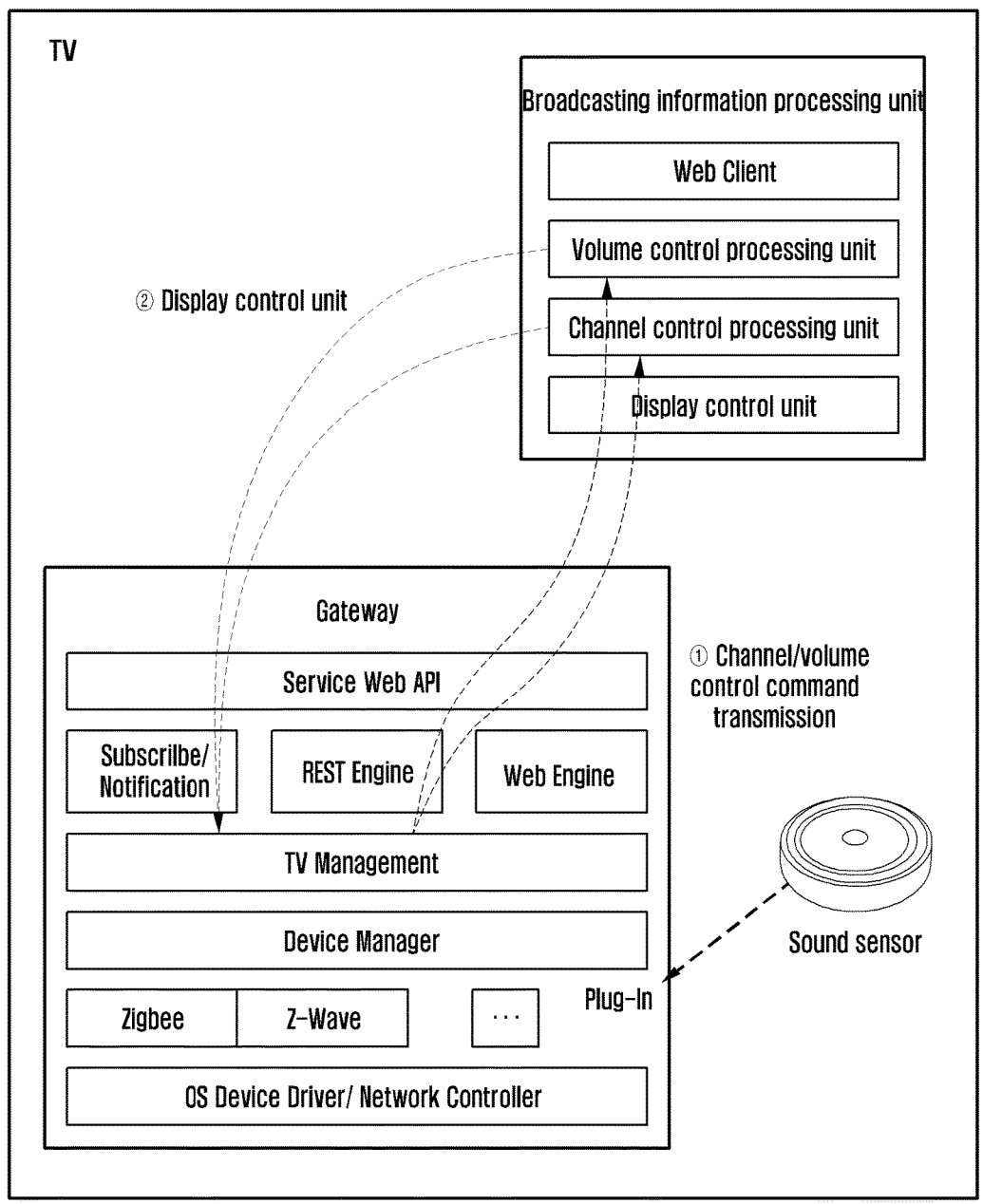
FIG. 7B is a diagram illustrating an example method for managing a content display device (TV) using at least one measurement device according to a fourth example embodiment of the present disclosure.

FIG. 7B is a diagram illustrating an example method for managing a content display device (TV) using at least one measurement device according to a fourth example embodiment of the present disclosure.

Referring to FIG. 7B, for convenience in explanation, as an example, the electronic device is included in the TV, but the scope of the present disclosure is not limited thereto. For example, the electronic device may be included in another device other than the TV, and may be located in a certain space as an individual device.

The electronic device may select a TV as a management target device, and may set two or more measurement devices for state determination of the TV. In the drawing, it is exemplified that a sound sensor and a broadcasting information processing unit that is included in the TV are set as the measurement devices.

Thereafter, the electronic device may operate to close a window and a curtain to set a measurement environment. However, the electronic device may omit the measurement environment setting operation.

Thereafter, the electronic device may transmit channel and volume control commands to the TV. A channel control processing unit that has received the channel control command may transmit a corresponding response to the electronic device. Further, a volume control processing unit that has received the volume control command may transmit a corresponding response to the electronic device.

The electronic device that has received the responses may determine whether the channel change that is expected in accordance with the transmitted channel control command corresponds to the response that is received from the broadcasting information processing unit and may compare the volume change that is expected in accordance with the volume control command with the volume change that is measured using the sound sensor.

In the case where a difference between the channel change that is expected in accordance with the channel control command and the response that is received from the broadcasting information processing unit is smaller than a predetermined threshold value, and a difference between the volume change that is expected in accordance with the volume control command and the volume change that is measured using the sound sensor is smaller than a predetermined threshold value, the electronic device determines that the TV is in a normal state.

On the other hand, in the case where the difference between the channel change that is expected in accordance with the channel control command and the response that is received from the broadcasting information processing unit is larger than the predetermined threshold value, or the difference between the volume change that is expected in accordance with the volume control command and the volume change that is measured using the sound sensor is larger than the predetermined threshold value, the electronic device determines that the TV is in an abnormal state, and may notify the manager of this.

However, the electronic device may determine whether the TV is in an abnormal state using any one of the channel and the volume.

Figure 8A:
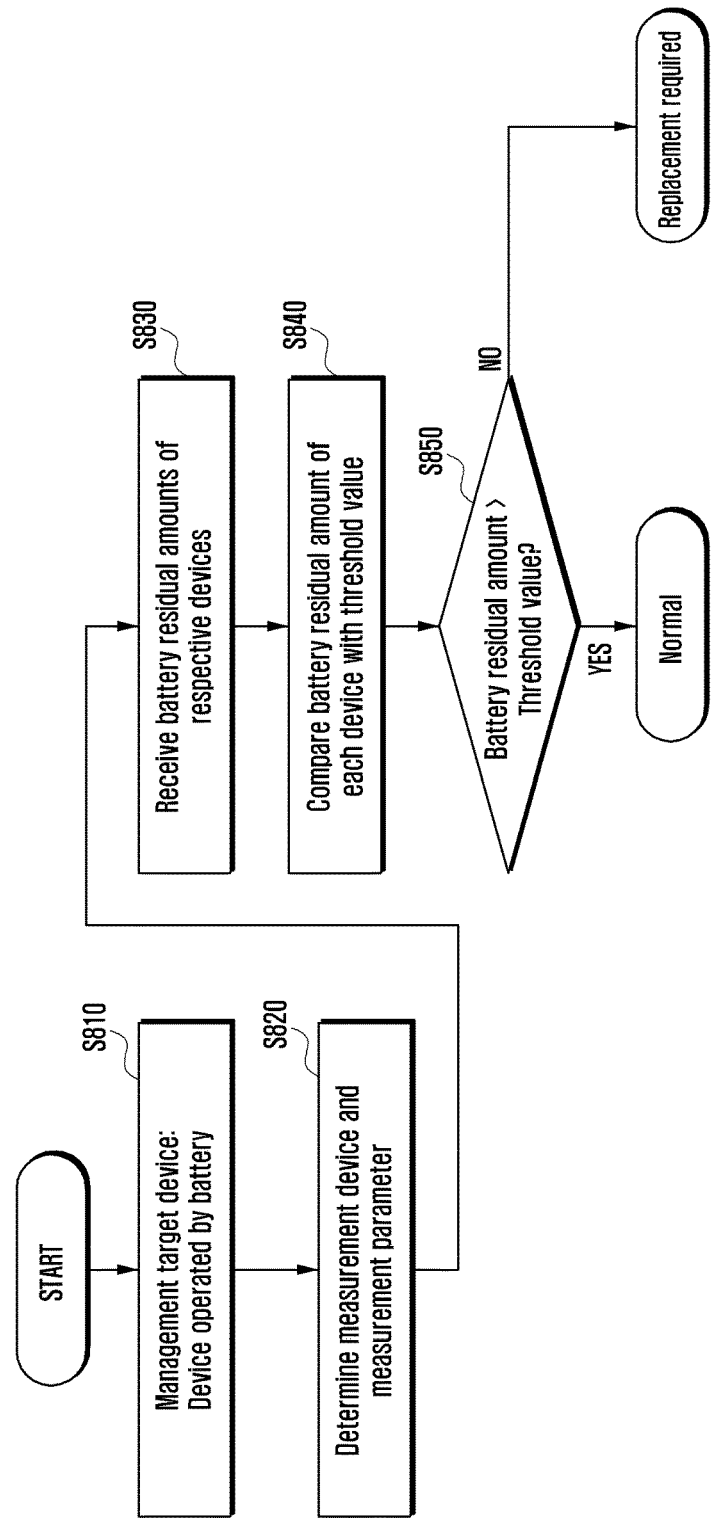
FIG. 8A is a flowchart illustrating an example method for managing a device that is operated by a battery using at least one measurement device according to a fifth example embodiment of the present disclosure.

FIG. 8A is a flowchart illustrating an example method for managing a device that is operated by a battery using at least one measurement device according to a fifth example embodiment of the present disclosure.

Referring to FIG. 8A, at operation S810, the electronic device may select a device that is operated by a battery as a management target device. For example, the electronic device may select a remote controller, a contact sensor, and a motion sensor as management target devices.

At operation S820, the electronic device that has selected the management target device may determine measurement parameters that may have an effect on the state determination of the device that is operated by a battery, and may determine at least one measurement device for measuring the measurement parameters. For example, the electronic device may determine a target device as the measurement device.

At operation S830, the electronic device may receive the residual amount of the battery from the device that is operated by the battery.

At operation S840, the electronic device may confirm a battery threshold value of each device, and may determine whether battery replacement is required by comparing the battery residual amount with the battery threshold value.

For example, at operation S850, the electronic device may confirm the battery threshold values for the respective devices from predetermined device threshold value information, and may compare the confirmed battery threshold value with the battery residual amount. If the battery residual amount is smaller than the predetermined threshold value, the electronic device may notify the manager that battery replacement is required.

The threshold values for the respective devices may be stored in the electronic device or may be received from a server. The detailed contents thereof will be described later.

FIG. 8B is a diagram illustrating example threshold value information according to a fifth example embodiment of the present disclosure.

The threshold value information for respective device kinds may be stored in the form of a table. The electronic device may set the threshold values based on battery replacement histories of the respective devices and may store them as the threshold value information.

For example, if it is determined that the battery residual amount is smaller than the threshold value, the electronic device may notify the manager that battery replacement is required. In this case, if the battery is replaced within a predetermined time, the electronic device may determine that the battery threshold value is set low or appropriately. Accordingly, the electronic device may maintain the threshold value or may increase the threshold value for a predetermined value. On the other hand, if the battery is not replaced within the predetermined time, the electronic device may determine that the threshold value is set high. Accordingly, the electronic device may decrease the threshold value to a predetermined value.

Further, the electronic device may differently set the threshold values based on the importance of the device that is operated by the battery, and may store them as the threshold value information. For example, in the case of door locks, if the battery has been discharged, a user may feel direct inconvenience. Accordingly, in the case of the door locks, the battery threshold value may be set high.

On the other hand, in the case of the contact sensor, the user may not feel direct inconvenience even if the battery has been discharged. Accordingly, in the case of the contact sensor, the battery threshold value may be set relatively low.

Further, the electronic device may set the battery threshold value in accordance with the battery residual amount that can normally operate the device, and may store the set battery threshold value as the threshold value information.

Further, the electronic device may receive the threshold value information from the server.

In the drawing, the electronic device may receive the battery residual amount of the motion sensor, and may determine whether to replace the battery through confirming the battery threshold value of the motion sensor.

Figure 8C:
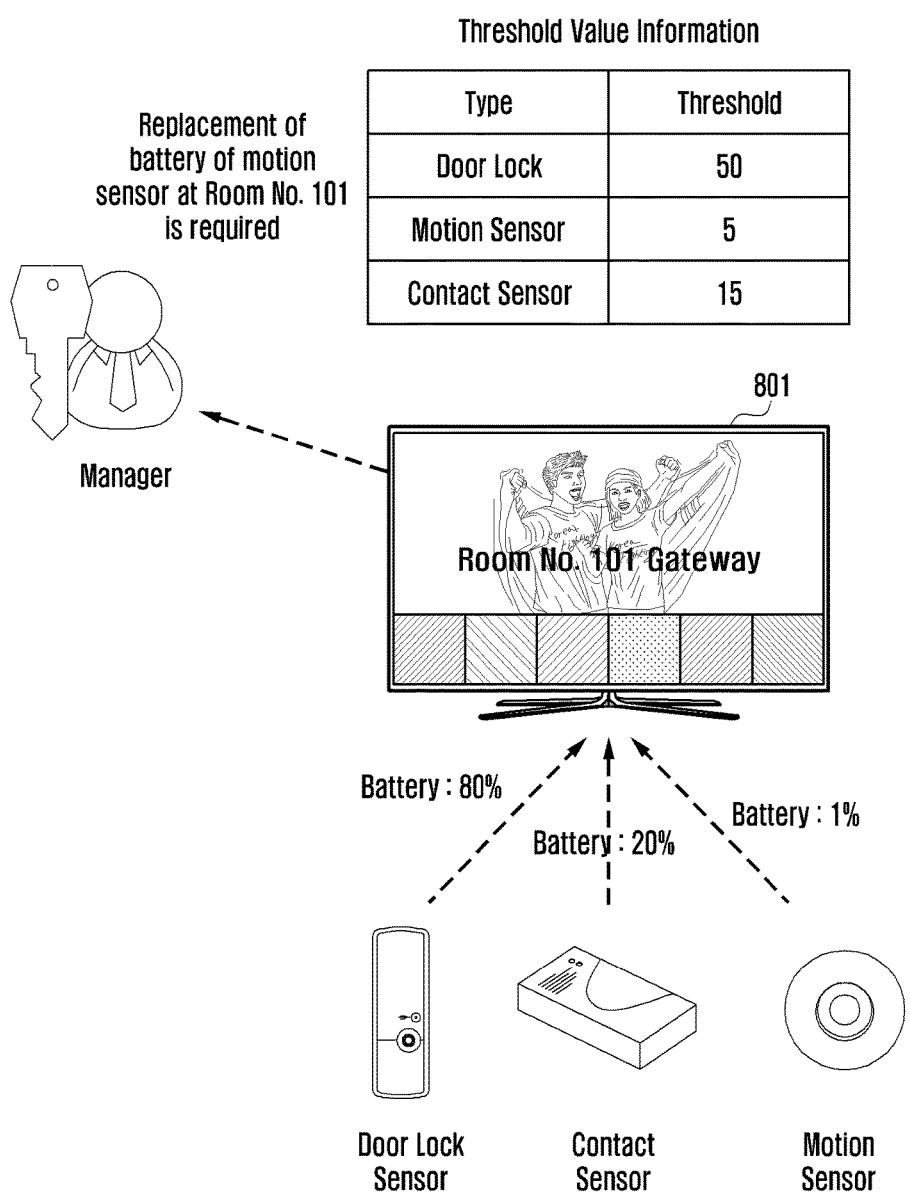
FIG. 8C is a diagram illustrating an example method for managing a device that is operated by a battery using at least one measurement device according to a fifth example embodiment of the present disclosure.

FIG. 8C is a diagram illustrating an example method for managing a device that is operated by a battery using at least one measurement device according to a fifth example embodiment of the present disclosure.

Referring to FIG. 8C, the electronic device selects a device that is operated by a battery as a management target device.

The electronic device may receive the battery residual amount from the device that is operated by the battery.

For example, the electronic device may receive the battery residual amounts from the door locks, the motion sensor, and the contact sensor.

Further, the electronic device may determine whether to replace the battery by comparing a pre-stored battery threshold value of each device with the battery residual amount.

In the drawing, the electronic device may receive information that the battery residual amount of the door locks is 80%, the battery residual amount of the motion sensor is 1%, and the battery residual amount of the contact sensor is 20%.

Further, the electronic device may confirm the battery threshold values of the respective devices through the threshold value information 803. In the drawing, it can be confirmed that the threshold value of the door locks is 50%, the threshold value of the motion sensor is 5%, and the threshold value of the contact sensor is 15%.

The battery threshold values may be values preset by the manager. Further, the battery threshold values may be values set by determining battery replacement histories.

Accordingly, it can be confirmed that the battery residual amounts of the door locks and the contact sensor exceed the threshold value, whereas the battery residual amount of the motion sensor is smaller than the threshold value, and the electronic device may notify the manager that the battery of the motion sensor should be replaced.

Figure 9:
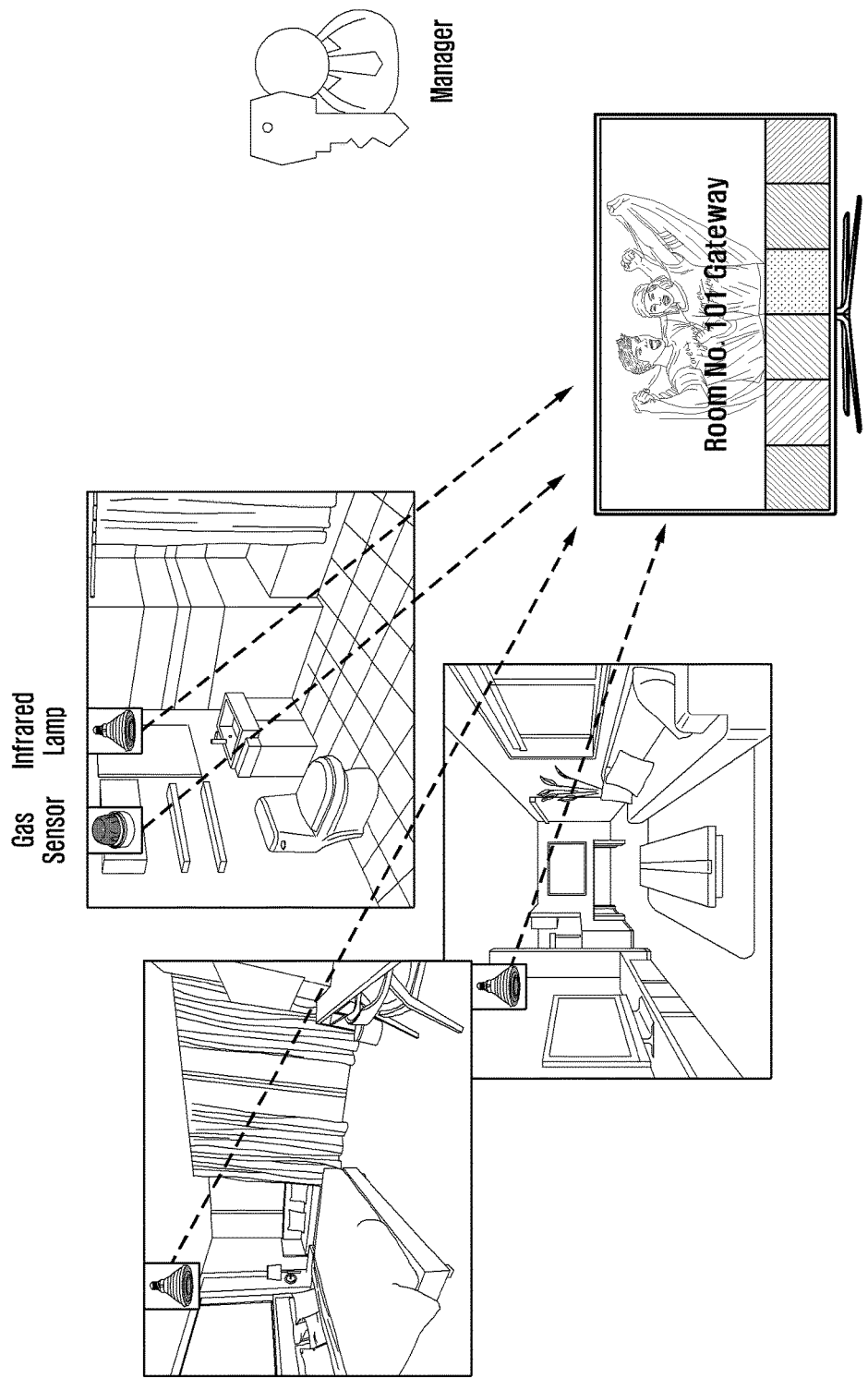
FIG. 9 is a diagram illustrating an example method for determining whether indoor pollution occurs using at least one measurement device according to a sixth example embodiment of the present disclosure.

FIG. 9 is a diagram illustrating an example method for determining whether indoor pollution occurs using at least one measurement device according to a sixth example embodiment of the present disclosure.

Referring to FIG. 9, if a user is absent in a predetermined space in which the electronic device is located, the electronic device may determine the degree of pollution of the predetermined space using at least one measurement device.

For example, in the case of a hotel, the electronic device may determine the cleaning state of a bedroom and a bathroom and the neatness state of bedclothes and carpets using an infrared lamp and an olfactory sensor. Further, the electronic device may notify the manager of the determined neatness state.

Further, the electronic device may determine whether commodities are used in a certain space using a weight sensor, and may notify the manager that necessary commodities should be immediately added.

Figure 10A:
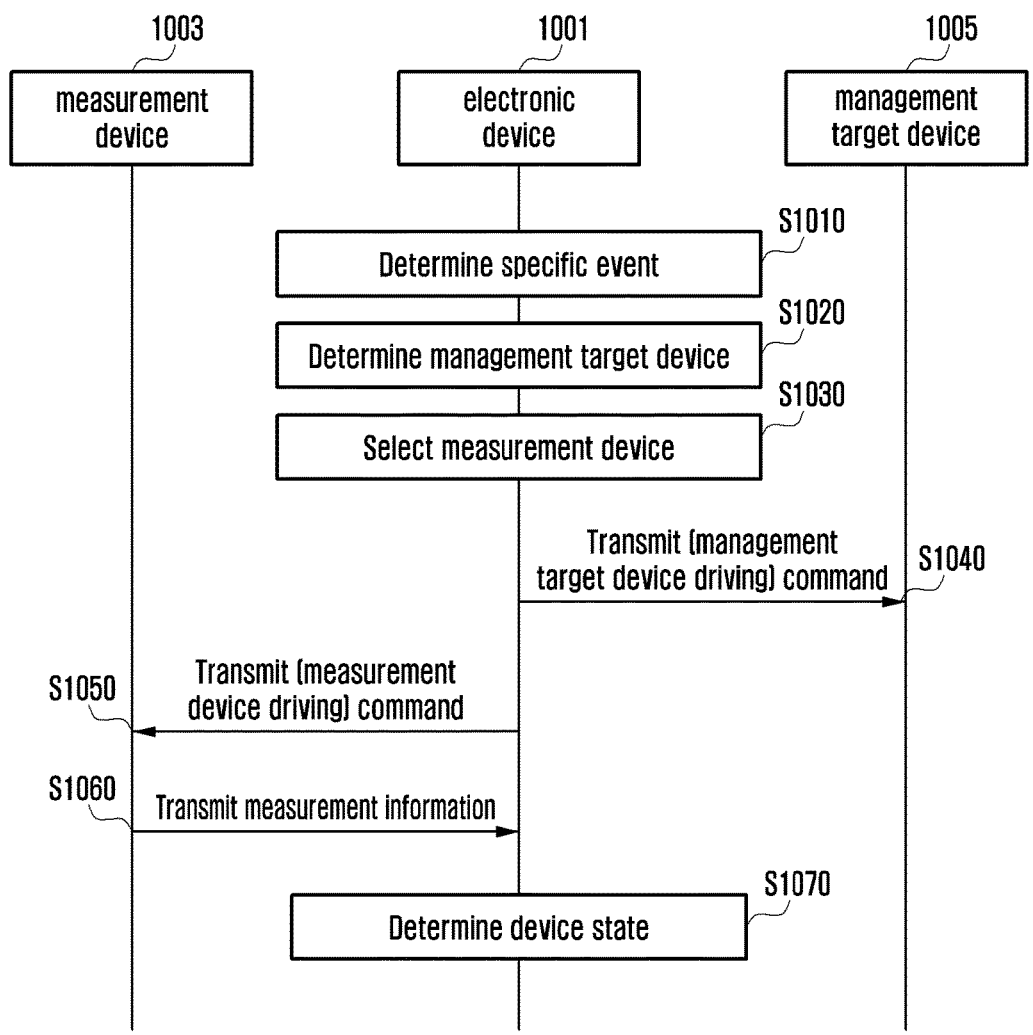
FIG. 10A is a sequence diagram illustrating an example process of determining a state of a device according to another example embodiment of the present disclosure.

FIG. 10A is a sequence diagram illustrating an example process of determining a state of a device according to another example embodiment of the present disclosure.

An electronic device 1001 may refer, for example, a device that determines the state of a device using measurement information that is received from a measurement device and controls the device. The electronic device may be connected to all devices that are located in a certain space to perform communication with the devices. Accordingly, the electronic device may transmit or receive information with other devices and may transmit signals for controlling the other devices. The configuration of the electronic device 1001 will be described in greater detail below with reference to FIG. 11. The electronic device 1001 may include a gateway. Further, the electronic device 1001 may be included in an electronic device, such as a TV, in a certain space in the form of a gateway. Further, the electronic device may be located inside the certain space as a separate device. Further, the electronic device may be located in the certain space in the form of a hub.

A measurement device 1003 may refer, for example, to a device for measuring the state of a management target device. The measurement device may include all kinds of sensors, such as an illumination sensor, a temperature sensor, a humidity sensor, a sound sensor, a motion sensor, and a proximity sensor, which are located in the certain space. In the case of receiving an operation command from the electronic device, the measurement device 1003 may perform the measurement and may transmit the measurement information to the electronic device. Further, the measurement device 1003 may periodically measure the state of the device and may transmit the measurement information to the electronic device. In the case where the measurement device 1003 periodically measures the state of the device and transmits the measurement information to the electronic device, the electronic device may determine the state of the device using only the information that is received from the selected measurement device.

A management target device 1005 may refer, for example, to a device that is selected by the electronic device to confirm the state among the devices located in the certain space. The management target device 1005 may include all kinds of devices, such as a lamp, an air conditioner, a temperature control device, and a speaker, which are located in the certain space. The management target device may be operated under the control of the electronic device, and the electronic device may operate the management target device, receive the measurement information from the measurement device, and determine the state of the management target device.

Referring to FIG. 10A, at operation S1010, the electronic device 1001 may determine whether a specific event has occurred. A case where the specific event has occurred may include a case where a user is absent in a certain space, a case where a user has checked out, and a case where a user is out just after housekeeping.

If it is determined that a specific event has occurred, the electronic device 1001 performs a process for confirming the state of the device. However, the electronic device 1001 may perform a process for periodically confirming the state of the device even in the case where a specific event has not occurred.

Accordingly, if the specific event has occurred, the electronic device 1001, at operation S1020, may determine the management target device for confirming the state of the device.

At operation S1030, the electronic device 1001 that has determined the management target device may select the measurement device based on the selected management target device. The electronic device 1001 may store a measurement device list that includes measurement devices that correspond to respective management target devices. In this example, the measurement device may measure information that is necessary to confirm the state of the management target device. Further, in the present disclosure, the measurement device list may be called measurement device information. The electronic device 1001 may store measurement device information as shown in Table 1 below.

TABLE 1

| Device | Measurement Device | Measurement Information | Additional Device |
|---|---|---|---|
| Lamp | Living Room Fluorescent Lamp Bedroom Fluorescent Lamp Bedroom Sleeping Lamp | In TV Illumination Sensor Proximity Sensor | Brightness | Curtain |
| Air Conditioner | Temperature control Device Fan | In Air Conditioner Temperature/ Humidity Sensor | Temperature | Window |
| Speaker | Main Speaker Sub-Speaker | In Telephone Speaker Phone | Volume | Window |

Accordingly, the electronic device 1001 may select the measurement device that corresponds to the selected management target device among measurement devices included in the measurement device information. The electronic device 1001 may select at least one of plural measurement devices included in the measurement device information.

For example, if a lamp is selected as the management target device, the electronic device 1001 may select at least one measurement device (sensor) among a TV, an illumination sensor, and a proximity sensor. In this example, the TV may perform a content display function as a first function, but if it is selected as the measurement device, it may operate as a sensing function that is a second function. Accordingly, the TV may sense the state of the management target device, and may generate the measurement information using this.

Further, if a cooling device (air conditioner) is selected as the management target device, the electronic device 1001 may select at least one of a sensor in the cooling device (air conditioner), a temperature sensor, and a humidity sensor.

Further, if a sound generation device (speaker) is selected as the management target device, the electronic device 1001 may select a terminal (telephone) as the measurement device (sensor). In this example, the terminal performs a communication function as a first function, but if it is selected as the measurement device, it may operate as a sensing function that is a second function. Accordingly, the terminal may sense the state of the management target device and may generate the measurement information using this.

Further, in the measurement device information, information on an additional device that corresponds to the management target device may be included. The additional device that corresponds to the management target device may refer, for example, to a device that may exert an influence on the measurement result of the measurement device. Further, the additional device may mean a device that is used to set an environment for measurement of the measurement device. Further, if the TV or a telephone is selected as the measurement device, the additional device may mean a device that is used to set an environment for performing a second function of the measurement device. For example, an illumination sensor is a sensor for measuring brightness of a lamp, and may be affected by an external light source. Accordingly, the measurement result of the illumination sensor may be affected by the external light source, and thus an external light source blocking device (e.g., curtain) may be stored in the measurement device information as an additional device of the lamp.

Accordingly, if the electronic device 1001 determines the lamp as the management target device, the curtain that corresponds to the lamp may be selected as the additional device to be controlled.

In the case where the electronic device selects and controls the additional device, the electronic device may confirm the state of the management target device using a part of the selected measurement devices. The detailed contents thereof are the same as those as described above.

At operation S1040, the electronic device 1001 that has selected the measurement device may transmit an operation command for operating the management target device to the management target device 1005. This is because the management target device should be operated in order to measure the state of the management target device.

Further, as described above, the electronic device 1001 may control the operation of the additional device that corresponds to the management target device after operating the management target device. The additional device may mean a device that can exert an influence in determining the state of the management target device. Further, the additional device may refer, for example, to a device that is used to set a condition for generating measurement information for the management target device. For example, if the management target device is the lamp, the electronic device 1001, at operation S1040, may operate to turn on the lamp to measure the brightness of the lamp. Further, the electronic device 1001 may operate to close the curtain that is the additional device in order to block the influence of the external light source.

Further, the electronic device may confirm whether the additional device is operated. After operating the additional device for measurement of the management target device, the electronic device may confirm whether the additional device is operated using a sensor located in a predetermined space, such as a sensor included in the additional device or a sensor included in the electronic device. For example, the sensor in the predetermined space may generate operation related information in accordance with operation of the additional device to transmit the generated information to the electronic device. Further, the electronic device may directly generate the operation related information of the additional device.

In this example, the operation related information may include whether the additional device is operated or the degree of operation of the additional device. Accordingly, the electronic device may confirm whether the additional device is operated and the operation degree of the additional device, and may use them in determining the state of the management target device.

For example, if the additional device is a curtain, the electronic device may confirm whether the curtain is operated using a motion sensor of the curtain. Further, even in the case where the curtain is operated, the degree of closing of the curtain may exert an influence in determining the state of the management target device. Accordingly, the electronic device may use information on the degree of operation (or degree of closing) of the curtain in determining the state of the management target device.

Further, at operation S1050, the electronic device 1001 may transmit the operation command to the measurement device 1003. The measurement device 1003 that has received the operation command performs the measurement. Further, at operation S1060, the measurement device 1003 may transmit the measurement information that is generated as the result of the measurement to the electronic device 1001.

For example, if the management device is the lamp, the electronic device 1001 may select the illumination sensor. Accordingly, the selected illumination sensor may measure the brightness of the lamp and may generate the measurement information as the result of the measurement to transmit the generated measurement information to the electronic device.

At operation S1070, the electronic device 1001 may determine the state of the management target device using the received measurement information. For example, the electronic device may determine the state of the management target device using information as illustrated in Table 2 below.

TABLE 2

| Device | Command | Measurement Information | Device State |
| --- | --- | --- | --- |
| Living Room Fluorescent Lamp | On | 500 lux, Flickering | Trouble |
| Temperature control Device | Set 24° C. | 28° C. | Trouble |
| Sub-speaker | Play | No sound | Trouble |

For example, if a temperature control device (thermostat) is selected as the management target device, the electronic device 1001, at operation S1040, may transmit a operation command for setting the temperature of the temperature control device to 24° C.

Further, the electronic device may select a temperature sensor to measure the temperature. Thereafter, the electronic device 1001 may receive the measurement information related to the current temperature from the selected temperature sensor. Accordingly, the electronic device 1001 may determine the state of the management target device in accordance with the information on the current temperature included in the received measurement device. The temperature of the temperature control device is set to 24° C., but if the current temperature that is included in the received measurement information is 28° C., the electronic device may determine that the temperature control device is out of order.

Figure 10B:
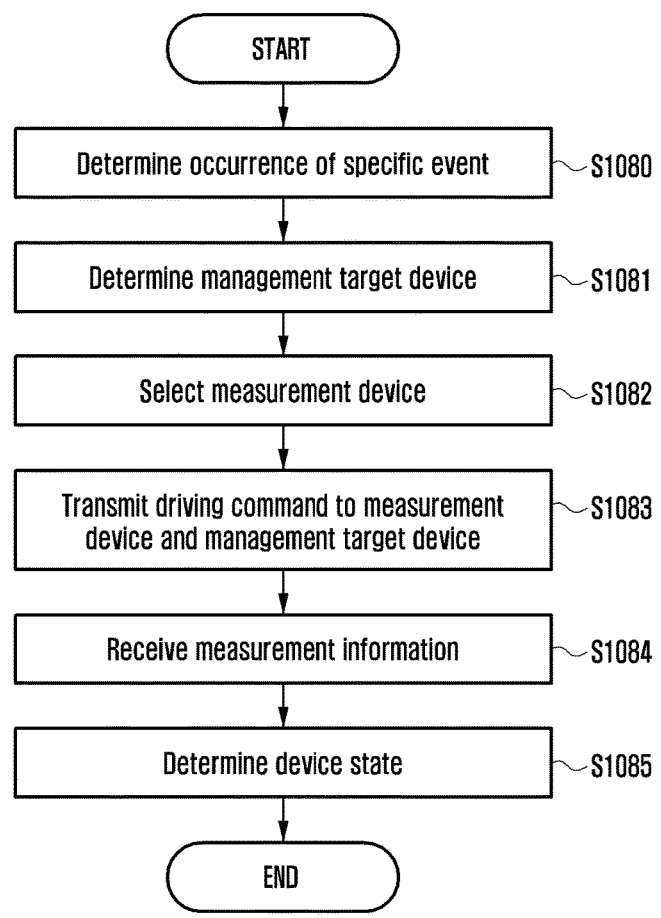
FIG. 10B is a flowchart illustrating an example process in which an electronic device determines a state of a device according to another example embodiment of the present disclosure.

FIG. 10B is a diagram illustrating an example process in which an electronic device determines a state of a device according to another example embodiment of the present disclosure.

At operation S1080, the electronic device may determine whether a specific event has occurred. For example, the electronic device may determine whether a user is absent in a certain space, whether a user has checked out, whether housekeeping has been completed, and whether a user is out. If it is determined that a specific event has occurred, the electronic device may perform a process for checking the state of the device at the following operations. Further, if a specific event has occurred and a predetermined period does not arrive, the electronic device may perform a process for checking the state of the device. This is to reduce power consumption that occurs in the case of checking the state of the device. Further, if a specific event has occurred and a checking period in accordance with a checking history arrives, the electronic device may check the state of the device.

In order to check the state of the device, the electronic device, at operation S1081, may determine the management target device for checking the state. The electronic device may determine the management target device based on the kind of the event that has occurred. For example, if the housekeeping is completed, the electronic device may set to periodically check the lamp.

After selecting the management target device, the electronic device, at operation S1082, may select the measurement device that corresponds to the management target device. The electronic device may confirm the measurement device that corresponds to the management target device through pre-stored measurement device information, and the electronic device may select at least one of the measurement devices.

Further, at operation S1083, the electronic device may transmit operation commands for operating the measurement device and the management target device. In this example, the electronic device may operate the additional device that corresponds to the management target device, and the detailed contents are the same as those as described above.

If the management target device that has received the operation command is operated, the measurement device may measure the management target device, and may generate measurement information to transmit the generated measurement information to the electronic device.

Accordingly, the electronic device may receive the measurement information at operation S1084, and may determine the state of the device using the measurement information at operation S1085. For example, the electronic device may compare the predetermined threshold range with information that is included in the received measurement information, and if the measurement information secedes from a predetermined threshold range or is smaller than the predetermined threshold value, the electronic device may determine that the corresponding device is out of order.

For example, it is assumed that the management target device is the lamp and the illumination sensor is selected. The electronic device may receive the measurement information that is related to the brightness of the lamp from the illumination sensor. In this example, if the brightness information that is included in the measurement information is 500 lux and the predetermined threshold range is 450 lux to 550 lux, the electronic device may determine that the lamp is in a normal state. On the other hand, if the brightness information that is included in the measurement information is 400 lux or information that indicates flickering of the lamp is included in the measurement information, the electronic device may determine that the lamp is out of order. Accordingly, the electronic device may transmit the determined device state to the server or the manager.

Figure 11:
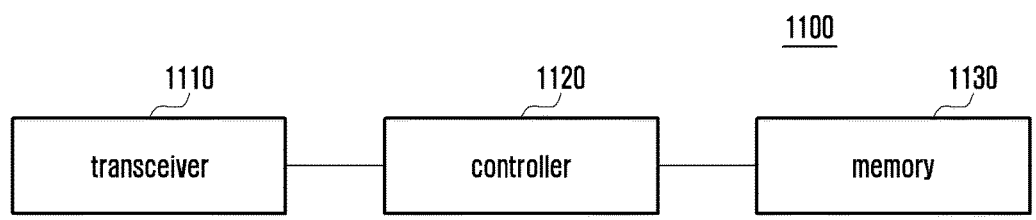
FIG. 11 is a diagram illustrating an example configuration of an electronic device according to an example embodiment of the present disclosure.

FIG. 11 is a diagram illustrating an example configuration of an electronic device 1100 according to an example embodiment of the present disclosure.

Referring to FIG. 11, an electronic device according to the present disclosure may include a transceiver (or communication unit, e.g., including communication circuitry) 1110, a controller (or control unit, e.g., including processing circuitry) 1120, and a memory (or storage unit) 1130. For example, when defining a controller in the specification, it may be stated that the controller may be a circuit, a dedicated processor, a CPU, an application-specific integrated circuit or at least one processor.

The transceiver 1110 may include various communication circuitry configured to perform communication with another network entity. The transceiver 1110 may receive the measurement information from another measurement device. Further, the transceiver 1110 may receive a manager's input from a server.

The controller 1120 may determine the kind of the management target in accordance with a predetermined condition, and may determine the management target device in accordance with the kind of the management target. Further, the controller 1120 may determine the management target device without determining the kind of the management target.

Further, the controller 1120 may determine the management target device in accordance with a predetermined condition, or may select the management target device in accordance with the manager's input. Further, the controller 1120 may determine measurement parameters for determining the state of the management target device and the measurement devices in accordance with the determined management target device.

Further, after selecting the management target device, the controller 1120 may determine whether a user is absent in a space where the electronic device is located.

If it is determined that the user is absent, the controller 1120 may set an environment for determining the state of the management target device. For example, the controller 1120 may control factors that have an effect on the state determination of the management target device.

Further, the controller 1120 may receive information that is measured through the at least two determined measurement devices, generate state information of the management target device based on combination of the information, and determine the state of the management target device.

However, in the case of controlling the factors that have an effect on determination of the state of the management target device, the controller 1120 may determine the state of the management target device using any one of the information measured by the measurement devices.

Further, the controller 1120 may generate the state information of the management target device through combination of a part of the information measured by the measurement devices in accordance with an external environment, and may determine the state of the management target device.

Further, the controller 1120 may transmit the state of the determined management target device to the server.

The memory 1130 may store threshold values for determining the states of the respective management target devices. Further, the memory 1130 may store a list of management target devices in accordance with the kinds of the management targets. Further, the memory 1130 may store a lot of devices connected to the electronic device and a lot of measurement devices.

Figure 12:
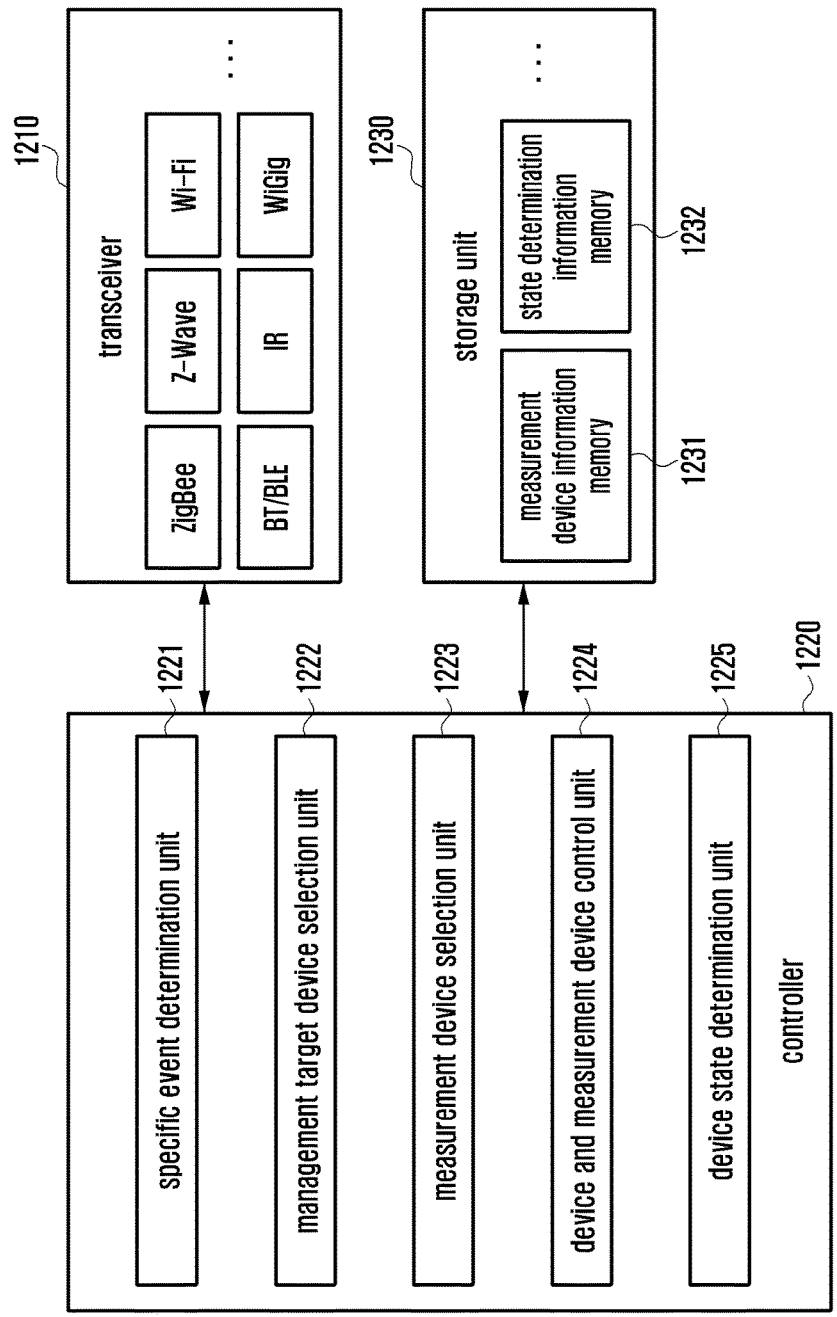
FIG. 12 is a diagram illustrating an example configuration of an electronic device according to an example embodiment of the present disclosure.

FIG. 12 is a diagram illustrating an example configuration of an electronic device according to an example embodiment of the present disclosure.

Referring to FIG. 12, an electronic device according to the present disclosure may include may include a transceiver (e.g., including communication circuitry) 1210, a controller (e.g., including processing circuitry)_1220, and a memory 1230.

The transceiver 1210 may include various communication circuitry in the form of, for example, plural modules, such as, for example, and without limitation, a Bluetooth module, a ZigBee module, a Z-Wave module, a Wi-Fi module, an IR module, and a WiGig module, or the like. The transceiver 1210 may perform communication with another entity using at least one of the modules. For example, the transceiver 1210 may perform communication with measurement devices and devices located in a certain space using the above-described communication method. Further, the transceiver 1210 may perform communication with a server or a manager using the above-described communication method.

The controller 1220 may include various programming modules, such as, for example, and without limitation, a specific event determination unit 1221, a management target device selection unit 1222, a measurement device selection unit 1223, a device and measurement device controller 1224, and a device state determination unit 1225.

The specific event determination unit 1221 may confirm whether a specific event has occurred. For example, if a user is out or checks out, the specific event determination unit 1211 may receive the information and may confirm whether the specific event has occurred.

The management target device selection unit 1222 may select the management target device in accordance with the occurrence of the specific event. Further, the management target device selection unit 1222 may select the management target device when the specific event occurs and a predetermined period arrives. The management target device selection unit 1222 may select any one of all kinds of devices located in the certain space as a management target device. The management target device selection unit 122 may select another device in accordance with the kind of the event that has occurred.

The measurement device selection unit 1223 may select a measurement device that corresponds to the selected management target device. The measurement device selection unit 1223 may select the measurement device that corresponds to the management target device using measurement device information that is stored in the memory. The measurement device selection unit 1223 may differently select the number of measurement devices to be selected or the kind of measurement devices in accordance with importance of the management target device. In this case, the importance of the management target device may be determined depending on whether trouble of the management target device causes direct inconvenience to the user in the case where the management target device is out of order. For example, if the lamp or the temperature control device is out of order, it causes direct inconvenience to the user, and thus high importance may be set. On the other hand, a device, such as a contact sensor, does not cause direct inconvenience to the user, and thus low importance may be set.

Further, the measurement device selection unit 1223 may select an additional device that corresponds to the management target device, and the detailed contents thereof are the same as those as described above.

The device and measurement device controller 1224 may transmit an operation command for operating the device and the measurement device. Further, the device and measurement device controller 1224 may transmit an operation command for operating the additional device.

The device state determination unit 1225 may determine the state of the device using measurement information that is received from the measurement devices. The device state determination unit 1225 may determine the state of the device using the received measurement information and a predetermined threshold range, and the detailed contents thereof are the same as those as described above.

The controller 1220 may transmit state information of the device that is determined through the above-described process to a server or a manager.

The memory 1230 may include a measurement device information memory 1231 and a state determination information memory 1232.

The measurement device information memory 1231 may store measurement device information that is information of the measurement devices that can be used to measure the states of the respective devices. Further, the measurement device information that is stored in the measurement device information memory 1231 may include information on the devices that may have an effect on the state determination of the respective devices.

Further, the measurement device information memory 1231 may store information related to check periods of the respective devices.

The state determination information memory 1232 may store information that is necessary for the device state determination. That is, the state determination information memory 1232 may store the measurement information when the respective devices are normally operated, and if the received measurement information secedes from the range of information that is stored in the state determination information memory, the controller 1220 may determine that the device is out of order.

Although various example embodiments of the present disclosure have been described herein and drawings and specific wordings have been used, these are merely used as general meanings to assist those of ordinary skill in the art to gain a comprehensive understanding of the present disclosure, and do not limit the scope of the present disclosure. It will be apparent to those of ordinary skill in the art to which the present disclosure pertains that various modifications are possible on the basis of the technical concept of the present disclosure in addition to the various example embodiments disclosed herein.

What is claimed is:

1. A method by an electronic device, comprising:
   determining a target device;
   selecting at least two different sensing devices for measuring an environment in which the target device operates, in order to identify a state of the target device;
   transmitting an operation command to the target device and controlling at least one other device for setting the environment for measuring the state of the target device;
   receiving measurement information from the at least two sensing devices, the measurement information being generated by measuring the environment when the target device operates based on the received operation command; and
   identifying the state of the target device based on the measurement information.

2. The method of claim 1, wherein the identifying the state of the target device further comprises determining, if two or more target devices are selected, a priority of the target devices based on characteristics of the target devices, and determining the state of each of the target devices based on the priority.

3. The method of claim 1, wherein the selecting further comprises transmitting another operation command to the at least two sensing devices.

4. The method of claim 1, wherein the controlling the at least one other device comprises:
   determining whether to operate the least one other device; and
   controlling the at least one other device, if the electronic device determines to operate the at least one other device.

5. The method of claim 1, wherein the determining the target device comprises determining the target device if an event occurs, and
   wherein the event includes a user not being located in a predetermined space.

6. The method of claim 1, wherein a weight value corresponding to each of the at least two sensing devices is applied to the measurement information.

7. An electronic device, the electronic device comprising:
   a transceiver; and
   a controller configured to:
      determine a target device,
      select at least two different sensing devices for measuring an environment in which the target device operates, in order to identify a state of the target device,
      transmit an operation command to the target device, and control at least one other device for setting the environment for measuring the state of the target device,
      receive measurement information from the at least two sensing devices, the measurement information being generated by measuring the environment when the target device operates based on the received operation command, and
      identify the state of the target device based on the measurement information.

8. The electronic device of claim 7, wherein the controller is configured to:
   determine, if two or more target devices are selected, a priority of the target devices based on characteristics of the target devices, and
   determine the states of each of the target devices based on the priority.

9. The electronic device of claim 7, wherein the controller is configured to transmit another operation command to the at least two sensing devices.

10. The electronic device of claim 7, wherein the controller is configured to:
    determine whether to operate the at least one other device, and
    control the at least one other device, if the electronic device determines to operate the at least one other device.

11. The electronic device of claim 7, wherein the controller is configured to determine the target device if an event occurs, and
    wherein the event includes a user not being located in a predetermined space.

12. The electronic device of claim 7, wherein a weight value corresponding to each of the at least two sensing devices is applied to the measurement information.

* * * * *